US010424790B2

United States Patent
Sonobe et al.

(10) Patent No.: US 10,424,790 B2
(45) Date of Patent: Sep. 24, 2019

(54) CARBONACEOUS MATERIAL FOR NON-AQUEOUS ELECTROLYTE SECONDARY BATTERY ANODE

(71) Applicant: Kureha Corporation, Tokyo (JP)

(72) Inventors: Naohiro Sonobe, Tokyo (JP); Kazuhiko Shimizu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 3 days.

(21) Appl. No.: 15/502,024

(22) PCT Filed: Aug. 10, 2015

(86) PCT No.: PCT/JP2015/072668
§ 371 (c)(1),
(2) Date: Feb. 6, 2017

(87) PCT Pub. No.: WO2016/021738
PCT Pub. Date: Feb. 11, 2016

(65) Prior Publication Data
US 2017/0237071 A1    Aug. 17, 2017

(30) Foreign Application Priority Data

Aug. 8, 2014 (JP) ................................ 2014-163112

(51) Int. Cl.
*H01M 4/587* (2010.01)
*H01M 4/133* (2010.01)
(Continued)

(52) U.S. Cl.
CPC ............ *H01M 4/587* (2013.01); *C01B 32/05* (2017.08); *H01M 4/133* (2013.01); *H01M 4/623* (2013.01);
(Continued)

(58) Field of Classification Search
None
See application file for complete search history.

(56) References Cited

U.S. PATENT DOCUMENTS

| 5,176,969 A | 1/1993 | Miyabayashi et al. |
| 5,616,436 A | 4/1997 | Sonobe et al. |
| (Continued) | | |

FOREIGN PATENT DOCUMENTS

| CN | 1255244 A | 5/2000 |
| CN | 1705148 A | 12/2005 |
| (Continued) | | |

OTHER PUBLICATIONS

Office Action dated Oct. 10, 2017, in Japanese Patent Application No. 2016-540772, with English translation.
(Continued)

*Primary Examiner* — Jeremiah R Smith
(74) *Attorney, Agent, or Firm* — Birch, Stewart, Kolasch & Birch, LLP

(57) ABSTRACT

An object of the present invention is to provide a non-aqueous electrolyte secondary battery which has a large charge/discharge capacity, has a small irreversible capacity, and is capable of effectively using an active material.
This object can be achieved by a material for a non-aqueous electrolyte secondary battery anode; a specific surface area determined by a BET method being not greater than 30 m²/g; an atomic ratio (H/C) of hydrogen atoms to carbon atoms determined by elemental analysis being not greater than 0.1; an average particle size being not greater than 50 μm; and a diffraction intensity ratio (R-value) determined by Equation (1) being not greater than 1.25: (wherein $I_{max}$ is a maximum value of a 002 diffraction intensity of carbon measured at an angle of diffraction (2θ) within a range of from 20 to 25° as determined by powder X-ray diffraction measured using CuKα rays; $I_{min}$ is a minimum value of a
(Continued)

diffraction intensity measured at an angle of diffraction (2θ) within a range of from 15 to 20° as determined by powder X-ray diffraction; and $I_{35}$ is a diffraction intensity at an angle of diffraction (2θ) of 35° as determined by powder X-ray diffraction).

4 Claims, 1 Drawing Sheet

(51) Int. Cl.
*H01M 4/62* (2006.01)
*H01M 4/66* (2006.01)
*H01M 10/0525* (2010.01)
*C01B 32/05* (2017.01)
*H01M 4/02* (2006.01)

(52) U.S. Cl.
CPC ........... *H01M 4/625* (2013.01); *H01M 4/661* (2013.01); *H01M 10/0525* (2013.01); *C01P 2002/72* (2013.01); *C01P 2002/74* (2013.01); *C01P 2004/61* (2013.01); *C01P 2006/10* (2013.01); *C01P 2006/12* (2013.01); *C01P 2006/40* (2013.01); *H01M 2004/021* (2013.01); *H01M 2004/027* (2013.01); *H01M 2220/20* (2013.01)

(56) References Cited

U.S. PATENT DOCUMENTS

| | | |
|---|---|---|
| 5,985,489 A | 11/1999 | Ohsaki et al. |
| 5,989,744 A | 11/1999 | Yamaura |
| 6,303,249 B1 | 10/2001 | Sonobe et al. |
| 6,316,144 B1* | 11/2001 | Xue ............... H01M 4/133 423/275 |
| 6,335,122 B1 | 1/2002 | Yamada et al. |
| 6,686,048 B1 | 2/2004 | Arimoto et al. |
| 7,759,289 B2 | 7/2010 | Iwasaki et al. |
| 7,858,239 B2 | 12/2010 | Shimizu et al. |
| 8,728,668 B2 | 5/2014 | Kawai et al. |
| 8,926,932 B2 | 1/2015 | Pfeifer et al. |
| 2002/0048144 A1 | 4/2002 | Sugo et al. |
| 2002/0061445 A1* | 5/2002 | Kitagawa ......... H01M 4/0471 429/231.8 |
| 2005/0152890 A1* | 7/2005 | Sonobe ............... A61K 33/44 424/125 |
| 2005/0266990 A1 | 12/2005 | Iwasaki et al. |
| 2006/0078796 A1* | 4/2006 | Ozaki ............... H01M 4/587 429/231.8 |
| 2007/0287068 A1 | 12/2007 | Shimizu et al. |
| 2008/0207442 A1 | 8/2008 | Pfeifer et al. |
| 2008/0274406 A1* | 11/2008 | Fuse ............... H01M 4/364 429/231.4 |
| 2009/0297953 A1* | 12/2009 | Shimizu ............ H01M 4/587 429/231.95 |
| 2010/0086856 A1* | 4/2010 | Matsumoto ........ H01M 4/1393 429/231.8 |
| 2010/0297500 A1 | 11/2010 | Kawai et al. |
| 2011/0111294 A1 | 5/2011 | Lopez et al. |
| 2012/0070733 A1* | 3/2012 | Yamada ............ H01M 4/133 429/211 |
| 2012/0328954 A1 | 12/2012 | Okabe et al. |
| 2013/0003261 A1* | 1/2013 | Remizov ............ H01G 11/06 361/527 |
| 2013/0302692 A1* | 11/2013 | Suzuki ............... H01M 4/133 429/231.8 |
| 2014/0050982 A1 | 2/2014 | Lu et al. |
| 2014/0178761 A1 | 6/2014 | Lu et al. |
| 2014/0356708 A1* | 12/2014 | Arikawa ............ H01M 4/587 429/215 |
| 2015/0024277 A1 | 1/2015 | Komatsu et al. |
| 2015/0171470 A1 | 6/2015 | Kobayashi et al. |
| 2015/0180020 A1 | 6/2015 | Komatsu et al. |
| 2015/0263347 A1 | 9/2015 | Imaji et al. |
| 2015/0357637 A1 | 12/2015 | Yamanoi et al. |
| 2016/0064735 A1 | 3/2016 | Tada et al. |
| 2016/0268590 A1 | 9/2016 | Koshima et al. |
| 2017/0125811 A1 | 5/2017 | Imaji et al. |
| 2017/0141380 A1 | 5/2017 | Aoki et al. |
| 2017/0141396 A1* | 5/2017 | Tabata ............... B01J 20/20 |
| 2017/0229708 A1 | 8/2017 | Sonobe et al. |
| 2017/0237070 A1 | 8/2017 | Sonobe et al. |
| 2017/0237071 A1 | 8/2017 | Sonobe et al. |
| 2018/0261875 A1 | 9/2018 | Imaji et al. |

FOREIGN PATENT DOCUMENTS

| | | |
|---|---|---|
| CN | 102630355 A | 8/2012 |
| CN | 104641499 A | 5/2015 |
| CN | 106133953 A | 11/2016 |
| EP | 0700105 A2 | 3/1996 |
| EP | 2 144 321 A1 | 1/2010 |
| EP | 2892096 A1 | 7/2015 |
| EP | 3 128 582 A1 | 2/2017 |
| JP | S57208079 A | 12/1982 |
| JP | S58209864 A | 12/1983 |
| JP | 3-252053 A | 11/1991 |
| JP | 8-64207 A | 3/1996 |
| JP | 8-236116 A | 9/1996 |
| JP | 9-7598 A | 1/1997 |
| JP | 9-204918 A | 8/1997 |
| JP | 2000-315500 A | 11/2000 |
| JP | 2000-327441 A | 11/2000 |
| JP | 2001-229926 A | 8/2001 |
| JP | 2002-104817 A | 4/2002 |
| JP | 2002-241117 A | 8/2002 |
| JP | 2005-132702 A | 5/2005 |
| JP | 2006-264991 A | 10/2006 |
| JP | 2006-264993 A | 10/2006 |
| JP | 2008-10337 A | 1/2008 |
| JP | 2008-297201 A | 12/2008 |
| JP | 2010-509174 A | 3/2010 |
| JP | 2013-534024 A | 8/2013 |
| JP | 2016-152222 A | 8/2016 |
| JP | 2016-178049 A | 10/2016 |
| KR | 2002-0009514 A | 2/2002 |
| KR | 10-2009-0016462 A | 2/2009 |
| KR | 10-2013-0008532 A | 1/2013 |
| KR | 10-2013-0062291 A | 6/2013 |
| KR | 10-2015-0030731 A | 3/2015 |
| TW | 200501484 A | 1/2005 |
| TW | 200723579 A | 6/2007 |
| TW | 200945651 A | 11/2009 |
| WO | WO9701192 A1 | 1/1997 |
| WO | WO 98/44580 A1 | 10/1998 |
| WO | WO 2004-114443 A1 | 12/2004 |
| WO | WO 2005/098999 A1 | 10/2005 |
| WO | WO 2008/058231 A2 | 5/2008 |
| WO | WO 2011/056847 A2 | 5/2011 |
| WO | WO 2011/148156 A1 | 12/2011 |
| WO | WO 2012/087698 A1 | 6/2012 |
| WO | WO 2013/118757 A1 | 8/2013 |
| WO | WO 2014/034857 A1 | 3/2014 |
| WO | WO 2014/034858 A1 | 3/2014 |
| WO | WO 2014/038492 A1 | 3/2014 |
| WO | WO 2014/112401 A1 | 7/2014 |
| WO | WO 2015/059892 A1 | 4/2015 |
| WO | WO 2016/021737 A1 | 2/2016 |

OTHER PUBLICATIONS

Communication Pursuant to Article 94(3) EPC dated Jan. 25, 2018, in European Patent Application No. 15 829 774.7.
Notification of Reasons for Refusal dated Jan. 23, 2018, in Japanese Patent Application No. 2016-540772, with English translation.
Office Action dated Jan. 4, 2017, in Taiwan Patent Appiication No. 104123324, with English translation.
International Search Report of PCT/JP2015/072668 dated Nov. 10, 2015.

(56) References Cited

OTHER PUBLICATIONS

Extended European Search Report dated Apr. 18, 2017, in European Patent Application No. 15829774.7.
Communication Pursuant to Article 94(3) EPC dated Jan. 24, 2018, in European Patent Application No. 15 830 384.2.
Communication Pursuant to Rule 114(2) EPC dated Apr. 17, 2018, in European Patent Application No. 15830384.2.
Extended Extended European Search Report dated Apr. 13, 2017, in European Patent Application No. 15830384.2.
Extended European Search Report dated Jun. 20, 2017, in European Patent Application No. 15830721.5.
International Search Report dated Nov. 10, 2015, in PCT/JP2015/072666.
International Search Report dated Nov. 10, 2015, in PCT/JP2015/072667.
Non-Final Office Action dated Jul. 12, 2018, in U.S. Appl. No. 15/501,970.
Non-Final Office Action dated Sep. 26, 2018, in U.S. Appl. No. 15/501,982.
Office Action dated Apr. 18, 2018, in Korean Patent Application No. 10-2017-7003065, with English translation.
Office Action dated Apr. 19, 2016, in Taiwan Patent Application No. 104123322, with English translation.
Office Action dated Dec. 5, 2017, in Japanese Patent Application No. 2016-540770, with English translation.
Office Action dated Dec. 5, 2017, in Japanese Patent Application No. 2016-540771, with English translation.
Office Action dated Oct. 11, 2016, in Taiwan Patent Application No. 104123319, with English translation.
Office Action dated Oct. 9, 2018, in Chinese Patent Application No. 201580042307.0, with English translation.
Office Action dated Sep. 5, 2018, in Chinese Patent Application No. 201580041493.6, with English translation.
Third-Party Submission dated Feb. 13, 2018, in U.S. Appl. No. 15/501,982.
Notification of Reasons for Refusal dated Jul. 24, 2018, in Japanese Patent Application No. 2016-540772, with English translation.
Office Action dated Jan. 21, 2019, in Korean Patent Application No. 10-2017-7003070, with English translation.
Chinese Office Action and Search Report, dated Apr. 4, 2019, for Chinese Application No. 201580042307.0, with an English translation.
Chinese Office Action for Chinese Patent Application No. 201680050003.3, dated Apr. 19, 2019, with an English translation.
Chinese Office Action for Chinese Patent Application No. 201680050003.3, dated Oct. 9, 2018.
Extended European Search Report for European Patent Application No. 16851319.0, dated Jul. 25, 2018.
International Preliminary Report on Patentability and English translation of the Written Opinion of the International Searching Authority for International Application No. PCT/JP2016/077881, dated Apr. 3, 2018.
Korean Office Action for Korean Patent Application No. 10-2018-7006096, dated Jun. 16, 2018.
Korean Office Action, dated Feb. 18, 2019, for Korean Application No. 10-2017-7003245, with an English translation.
U.S. Office Action for U.S. Appl. No. 15/501,982, dated Apr. 17, 2019.
U.S. Office Action for U.S. Appl. No. 15/756,183, dated Nov. 6, 2018.
U.S. Office Action, dated May 16, 2019, for U.S. Appl. No. 15/756,183.

* cited by examiner

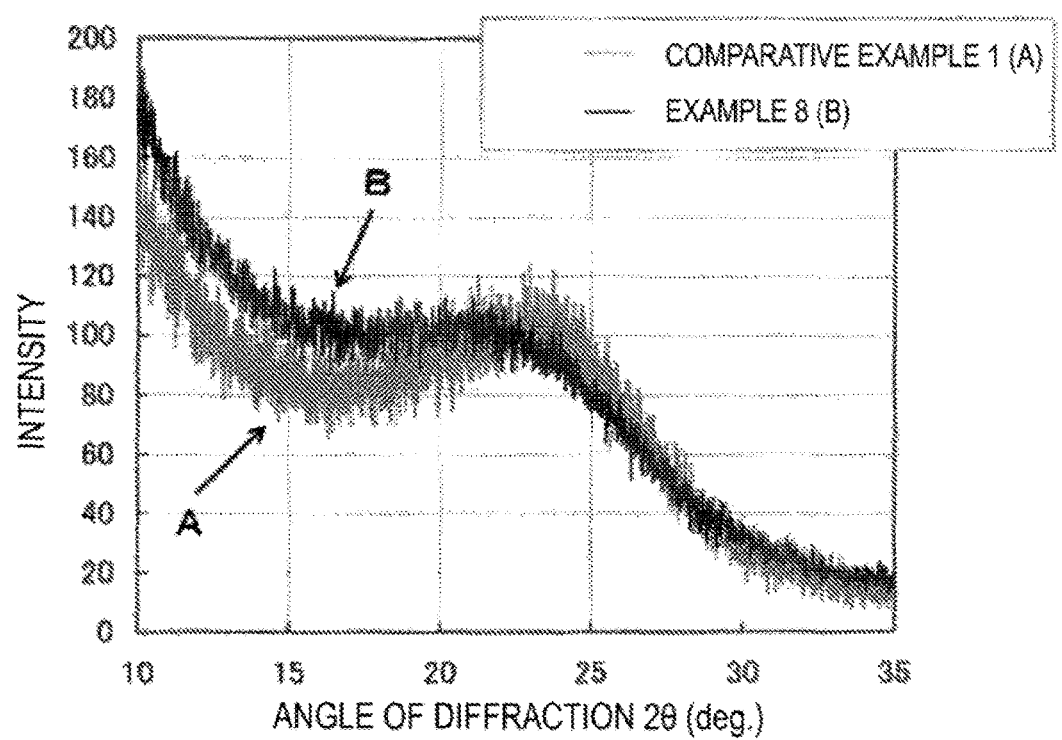

CARBONACEOUS MATERIAL FOR NON-AQUEOUS ELECTROLYTE SECONDARY BATTERY ANODE

TECHNICAL FIELD

The present invention relates to a carbonaceous material for a non-aqueous electrolyte secondary battery anode. With the present invention, it is possible to provide a carbonaceous material for a non-aqueous electrolyte secondary battery anode exhibiting a high capacity and excellent charge/discharge efficiency.

BACKGROUND ART

As the high functionality of small portable devices such as mobile telephones or notebook personal computers progresses, increases in the energy density of secondary batteries used as the power supplies thereof are anticipated. A non-aqueous solvent-type lithium secondary battery using a carbonaceous material as an anode has been proposed as a secondary battery having a high energy density (Patent Document 1).

In recent years, large secondary batteries, having high energy density and excellent output characteristics, are being mounted in electric vehicles in response to increasing concern over environmental issues. For example, increasing use of non-aqueous electrolyte secondary batteries is anticipated in vehicle applications such as in electric vehicles (EV), which are driven solely by motors, and plug-in hybrid electric vehicles (PHEV) and hybrid electric vehicles (HEV) in which internal combustion engines and motors are combined. In particular, lithium-ion secondary batteries, which are non-aqueous solvent-type lithium secondary batteries, are widely used as secondary batteries having high energy density, and further increases in energy density are anticipated in order to extend the cruising distance with one charge in EV applications.

High energy density requires a large doping and de-doping capacity of lithium in the anode material, but the theoretical lithium storage capacity of graphitic materials that are mainly used presently is 372 Ah/kg, and there are theoretical limits. Further, when forming an electrode using a graphitic material, a graphite intercalation compound is formed as the graphitic material is doped with lithium, which increases the interlayer spacing. The interlayer spacing returns to normal as a result of de-doping the lithium doped between layers. Therefore, with a graphitic material having an advanced graphite structure, repeated doping and de-doping of lithium (repeated charging and discharging in the secondary battery) causes a repeated increase and return of spacing, which tends to lead to the breakdown of graphite crystals. Accordingly, secondary batteries formed using graphite or a graphitic material having an advanced graphite structure are said to have poor charging and discharging repeating characteristics. Further, in batteries having such an advanced graphite structure, a problem in which the electrolyte solution tends to degrade easily at the time of battery operation has also been indicated.

On the other hand, alloy-based anode materials containing tin, silicon, or the like have also been proposed as materials having a large capacity, but the durability is insufficient, so the use of such materials is limited.

In contrast, non-graphitic carbon materials have excellent durability and have a large capacity exceeding the theoretical lithium storage capacity per unit weight of the graphitic material, so various proposals have been made for such materials as high-capacity anode materials. For example, the use of a carbonaceous material obtained by subjecting a phenol resin to heat treatment as an anode material for a secondary battery has been proposed (Patent Document 2). However, when an anode is produced using a carbonaceous material obtained by subjecting phenol resin to heat treatment at a high temperature such as 1900° C. or higher, for example, there is a problem in that the doping and de-doping capacity of the active material such as lithium into the anode carbon is small. In addition, if an anode is produced using a carbonaceous material prepared by heat-treating a phenol resin at a relatively low temperature, such as around 480 to 700° C., the doping amount of lithium used as an active material is large, which is preferable. However, lithium doped into an anode carbon may not be completely de-doped and a large amount of lithium may remain in the anode carbon. Such a wasteful consumption of lithium, which is an active material, is a problem.

In addition, in the production process of a carbonaceous material, a production method for carbon for a lithium secondary battery has been proposed, the production method comprising the steps of: obtaining halogenated dry-distilled carbon by bringing a halogen-containing gas into contact with dry-distilled carbon; a de-halogenating step of obtaining a de-halogenated carbon by removing some or all of the halogens in the halogenated dry-distilled carbon; and a pore preparation step of bringing the de-halogenated carbon into contact with pyrolytic hydrocarbon (Patent Document 3). With this method, a large doping and de-doping capacity can be achieved. However, lithium doped into an anode carbon may not be completely de-doped and a large amount of lithium may remain in the anode carbon. Such a wasteful consumption of lithium, which is an active material, is a problem.

CITATION LIST

Patent Literature

Patent Document 1: Japanese Unexamined Patent Application Publication No. S57-208079A
Patent Document 2: Japanese Unexamined Patent Application Publication No. S58-209864A
Patent Document 3: WO 97/01192

SUMMARY OF INVENTION

Technical Problem

An object of the present invention is to provide a non-aqueous electrolyte secondary battery which has a large charge/discharge capacity, has a small irreversible capacity, which is the difference between the doping capacity and the de-doping capacity, and is capable of effectively using an active material. Another object of the present invention is to provide a carbonaceous material for a secondary battery electrode to be used in the battery described above.

Solution to Problem

As a result of conducting dedicated research on non-aqueous electrolyte secondary batteries having a large charge/discharge capacity and a small irreversible capacity, the present inventors made the surprising discovery that a carbonaceous material in which the maximum value of the 002 diffraction intensity of carbon at an angle of diffraction (2θ) within the range of from 20 to 25°, the minimum value of the 002 diffraction intensity of carbon at an angle of diffraction (2θ) within the range of from 15 to 20°, and the diffraction intensity at an angle of diffraction (2θ) of 35° satisfying a certain relationship exhibits excellent characteristics as an active material for an anode of a non-aqueous electrolyte secondary battery.

The present invention is based on such knowledge.

Accordingly, the present invention relates to the following:

[1] A material for a non-aqueous electrolyte secondary battery anode, which has; a specific surface area determined by a BET method of not greater than 30 m²/g; an atomic ratio (H/C) of hydrogen atoms to carbon atoms determined by elemental analysis of not greater than 0.1; an average particle size of not greater than 50 μm; and a diffraction intensity ratio (R-value) determined by Equation (1) of not greater than 1.25:

[Formula 1]

$$R = \frac{I_{max} - I_{35}}{I_{min} - I_{35}} \quad (1)$$

(wherein $I_{max}$ is a maximum value of a 002 diffraction intensity of carbon at an angle of diffraction (2θ) within a range of from 20 to 25° as determined by powder X-ray diffraction; $I_{min}$ is a minimum value of a 002 diffraction intensity of carbon at an angle of diffraction (2θ) within a range of from 15 to 20° as determined by powder X-ray diffraction; and $I_{35}$ is a diffraction intensity at an angle of diffraction (2θ) of 35° as determined by powder X-ray diffraction).

[2] The carbonaceous material for a non-aqueous electrolyte secondary battery anode according to [1], wherein a true density measured using a helium gas as a replacement medium is not less than 1.80 g/cm³.

[3] The carbonaceous material for a non-aqueous electrolyte secondary battery anode according to [1] or [2] containing from 0.05 to 5 wt. % of an elemental alkali metal.

[4] A non-aqueous electrolyte secondary battery anode containing the carbonaceous material described in any one of [1] to [3].

[5] A non-aqueous electrolyte secondary battery containing the carbonaceous material described in any one of [1] to [3].

Further, this specification discloses that [5] the carbonaceous material according to [1] or [2] is obtained by a production method for a carbonaceous material for a non-aqueous electrolyte secondary battery electrode, the method comprising:

(1) impregnating an alkali metal compound to a carbonaceous material precursor by adding a compound including an elemental alkali metal to obtain an alkali-metal-compound-impregnated carbonaceous material precursor (may be referred to as an "alkali-metal-impregnated carbonaceous material precursor" hereafter) (this step may be referred to as the "alkali-impregnating step" hereafter);

(2) subjecting the alkali-metal-impregnated carbonaceous material precursor to heat treatment by: (a) subjecting the alkali-metal-impregnated carbonaceous material precursor to main heat treatment in a non-oxidizing gas atmosphere at a temperature from 800° C. to 1500° C. to obtain a heat treated product, or (b) subjecting the alkali-metal-impregnated carbonaceous material precursor to pre-heat treatment in a non-oxidizing gas atmosphere at a temperature of from 400° C. or higher and less than 800° C., and subjecting the alkali-metal-impregnated carbonaceous material precursor to main heat treatment in a non-oxidizing gas atmosphere at a temperature of 800° C. to 1500° C. to obtain a heat treated product; and (3) coating the heat treated product with pyrolytic carbon.

Advantageous Effects of Invention

The carbonaceous material for a non-aqueous electrolyte secondary battery anode of the present invention has a pore structure suitable for storing lithium. This is indicated by the diffraction intensity ratio (R-value) determined by Equation (1) being not greater than 1.25:

[Formula 2]

$$R = \frac{I_{max} - I_{35}}{I_{min} - I_{35}} \quad (1)$$

(wherein $I_{max}$ is the maximum value (peak top value) of the 002 diffraction intensity of carbon measured at an angle of diffraction (2θ) within the range of from 20 to 25° as determined by powder X-ray diffraction measured using CuKα rays; $I_{min}$ is the minimum value of the diffraction intensity measured at an angle of diffraction (2θ) within the range of from 15 to 20° as determined by powder X-ray diffraction; and $I_{35}$ is the diffraction intensity at an angle of diffraction (2θ) of 35° as determined by powder X-ray diffraction]). That is, the carbonaceous material has a high doping capacity and de-doping capacity. By using the carbonaceous material of the present invention as an anode material, it is possible to obtain a non-aqueous electrolyte secondary battery having a high energy density.

BRIEF DESCRIPTION OF DRAWINGS

FIG. 1 illustrates powder X-ray diffraction patterns of the carbonaceous materials of Example 8 and Comparative Example 1.

DESCRIPTION OF EMBODIMENTS

[1] Anode Material for Non-Aqueous Electrolyte Secondary Battery

In the anode material for a non-aqueous electrolyte secondary battery of the present invention, the specific surface area determined by a BET method is not greater than 30 m²/g; the atomic ratio (H/C) of hydrogen atoms to carbon atoms determined by elemental analysis is not greater than 0.1; the average particle size is not greater than 50 μm; and the diffraction intensity ratio (R-value) determined by Equation (1) is not greater than 1.25:

[Formula 3]

$$R = \frac{I_{max} - I_{35}}{I_{min} - I_{35}} \quad (1)$$

(wherein $I_{max}$ is the maximum value of the 002 diffraction intensity of carbon measured at an angle of diffraction (2θ) within the range of from 20 to 25° as determined by powder X-ray diffraction measured using CuKα rays; $I_{min}$ is the minimum value of the diffraction intensity measured at an angle of diffraction (2θ) within the range of from 15 to 20° as determined by powder X-ray diffraction; and $I_{35}$ is the diffraction intensity at an angle of diffraction (2θ) of 35° as determined by powder X-ray diffraction).

First, the diffraction intensity ratio (R-value) will be described. As illustrated in FIG. 1, the X-ray diffraction pattern indicated by curve A in FIG. 1 is obtained by powder X-ray diffraction for a carbonaceous material obtained by the conventional production method for a carbonaceous material described in Comparative Example 1. As is clear from curve A, the intensity decreases as the angle of diffraction (2θ) increases from approximately 10°. The diffraction intensity exhibits a local minimum in the range of from 15 to 20° for the angle of diffraction (2θ), but has a local maximum (diffraction peak) originating from the 002 plane of carbon in the range of from 20 to 25° for the angle of diffraction (2θ). The intensity then decreases due a decrease in diffracted X-rays for the angle of diffraction (2θ) larger than 25°.

On the other hand, the X-ray diffraction pattern indicated by curve B in FIG. 1 is obtained by powder X-ray diffraction for a carbonaceous material obtained by the production method described in Example 8. As is clear from curve B, a trend is observed in which the local minimum of the diffraction intensity within the range of from 15 to 20° for the angle of diffraction (2θ) is larger than that in Comparative Example 1, and the maximum of the diffraction intensity within the range of from 20 to 25° for the angle of diffraction (2θ) is smaller than that in Comparative Example 1. It is clear that the pore structures differ between a carbonaceous material exhibiting an X-ray diffraction pattern with a trend such as that in curve A in FIG. 1 and a carbonaceous material exhibiting an X-ray diffraction pattern with a trend such as that in curve B in FIG. 1.

Specifically, the average interlayer spacing of the 002 planes calculated by Bragg's reflection equation from the peak position of the 002 diffraction line observed in curve A corresponds to approximately 0.4 nm. Values of 2θ=15° and 20° respectively correspond to approximately 0.6 nm and 0.44 nm, and the fact that this scattering intensity increases means that pores of from 0.4 to 0.6 nm increases. These pores are effective as storage locations for lithium, and an increase in the scattering intensity at 2θ of from 15 to 20° with respect to the 002 diffraction intensity means that there is an increase in lithium storage sites, which leads to an increase in the doping and de-doping capacity.

The upper limit of the R-value is not limited as long as it is not greater than 1.25, but the value is preferably not greater than 1.20. The lower limit of the R-value is not limited but is preferably not less than 0.65 and more preferably not less than 0.70. This is because when the R-value is smaller than 0.65, the skeleton structure of carbon becomes brittle.

Specific Surface Area

The specific surface area may be determined with an approximation formula derived from a BET formula based on nitrogen adsorption. The specific surface area of the carbonaceous material of the present invention is not greater than 30 m$^2$/g. When the specific surface area exceeds 30 m$^2$/g, decomposition reactions with the electrolyte solution increase, which may lead to an increase in irreversible capacity and therefore a decrease in battery performance. The upper limit of the specific surface area is preferably not greater than 30 m$^2$/g, more preferably not greater than 20 m$^2$/g, and particularly preferably not greater than 10 m$^2$/g. In addition, the lower limit of the specific surface area is not particularly limited, but when the specific surface area is less than 0.5 m$^2$/g, the input/output characteristics may be diminished, so the lower limit of the specific surface area is preferably not less than 0.5 m$^2$/g.

Atomic Ratio (H/C) of Hydrogen Atoms to Carbon Atoms

The H/C ratio was determined by measuring hydrogen atoms and carbon atoms by elemental analysis. Since the hydrogen content of the carbonaceous material decreases as the degree of carbonization increases, the H/C ratio tends to decrease. Accordingly, the H/C ratio is effective as an index expressing the degree of carbonization. The H/C ratio of the carbonaceous material of the present invention is at most 0.1 and preferably at most 0.08. The H/C ratio is particularly preferably not greater than 0.05. When the H/C ratio of hydrogen atoms to carbon atoms exceeds 0.1, the amount of functional groups present in the carbonaceous material increases, and the irreversible capacity increases due to a reaction with lithium.

Average Particle Size

The average particle size ($D_{v50}$) of the carbonaceous material of the present invention is from 1 to 50 μm. The lower limit of the average particle size is preferably not less than 1 μm, more preferably not less than 1.5 μm and particularly preferably not less than 2.0 μm. When the average particle size is less than 1 μm, the specific surface area increases due to an increase in fine powder. Therefore, the reactivity with an electrolyte solution increases, and the irreversible capacity, which is the capacity that is charged but not discharged, also increases, and the percentage of the cathode capacity that is wasted thus increases, which is not preferable. The upper limit of the average particle size is preferably not greater than 40 μm and more preferably not greater than 35 μm. When the average particle size exceeds 50 μm, the diffusion free path of lithium within particles increases, which makes rapid charging and discharging difficult. Furthermore, in the case of a secondary battery, increasing the electrode area is important for improving the input/output characteristics, so it is necessary to reduce the coating thickness of the active material on the current collector at the time of electrode preparation. In order to reduce the coating thickness, it is necessary to reduce the particle size of the active material. From this perspective, the upper limit of the average particle size is preferably not greater than 50 μm.

True Density

The true density of a graphitic material having an ideal structure is 2.27 g/cm$^3$, and the true density tends to decrease as the crystal structure becomes disordered. Accordingly, the true density can be used as an index expressing the carbon structure.

Helium True Density

The true density ($\rho_H$) measured using helium gas as a replacement medium is an indicator of helium gas diffusibility. If this value is a large value near the theoretical density of 2.27 g/cm$^3$, it means that there are many pores through which helium can permeate. This means that there is an abundance of open pores. On the other hand, because helium has a very small atomic diameter (0.26 nm), pores equal to or smaller in size than the helium atom diameter are considered to be closed pores, and low helium gas diffusibility means that there are many closed pores. The anode material for a non-aqueous electrolyte secondary battery of the present invention is not particularly limited, but the true density measured using helium gas as a replacement medium is preferably not less than 1.80 g/cm$^3$. The lower limit of the helium true density is preferably not less than 1.85 g/cm$^3$ and more preferably not less than 1.90 g/cm$^3$. The upper limit of the helium true density is not particularly limited. A carbonaceous material having a helium true density of less than 1.80 g/cm$^3$ may have many closed pores and a small doping/de-doping capacity.

Butanol True Density

The butanol true density of the carbonaceous material of the present invention is from 1.10 to 1.60 g/cm$^3$. The upper limit of the true density is preferably not greater than 1.55 g/cm$^3$, more preferably not greater than 1.50 g/cm$^3$, even more preferably not greater than 1.48 g/cm$^3$, and most preferably not greater than 1.45 g/cm$^3$. The lower limit of the true density is preferably not less than 1.15 g/cm$^3$, more preferably not less than 1.20 g/cm$^3$, even more preferably not less than 1.25 g/cm$^3$, and even more preferably not less than 1.30 g/cm$^3$. A carbonaceous material having a true density exceeding 1.60 g/cm$^3$ may have a small number of pores of a size capable of storing lithium, and the doping and de-doping capacity may be small. In addition, increases in true density involve the selective orientation of the carbon hexagonal plane, so the carbonaceous material often undergoes expansion and contraction at the time of lithium doping and de-doping, which is not preferable. On the other hand, in the case of a carbonaceous material having a true density of less than 1.10 g/cm$^3$, the electrolyte solution permeates the pores, and a stable structure for lithium storage sites cannot be maintained. Furthermore, the electrode density decreases and thus causes a decrease in the volume energy density.

Elemental Alkali Metal Content

The elemental alkali metal content of the carbonaceous material of the present invention is not particularly limited but is preferably from 0.05 to 5 wt. %. The lower limit of the elemental alkali metal content is more preferably 0.5 wt. %, and the upper limit is more preferably 4 wt. %, even more preferably 3 wt. %, and most preferably not greater than 1.5 wt. %. If the elemental alkali metal content is too high, the carbonaceous material becomes strongly alkaline, which may cause the gelification of the PVDF used as a binder and have an adverse effect on the charge/discharge characteristics. Therefore, the content is preferably set to 0.05 to 5 wt. % by removing the impregnated alkali metal by washing the alkali metal compound.

The elemental alkali metal content can be measured with the following method. A carbon sample containing a predetermined elemental alkali metal was prepared. And a calibration curve, which is the relationship between a content of the elemental alkali and an X-ray intensity corresponding to each elemental alkali metal was determined in advance. Next, the X-ray intensity corresponding to the elemental alkali metal in X-ray fluorescence analysis is measured, and the content of each elemental alkali metal is determined from the calibration curve created above. X-ray fluorescence analysis is performed under the following conditions using an X-ray fluorescence spectrometer manufactured by the Rigaku Corporation. A holder for irradiating from upper part is used, and the measured area of the sample is within a circumferential line having the diameter of 20 mm. The measurement sample is mounted, and a measurement is performed after the surface is covered with a polyethylene terephthalate film.

The elemental alkali metal contents of the carbonaceous materials of Examples 1 to 18 were not greater than 1.5 wt. %.

The carbonaceous material of the present invention is not limited but may be obtained by the following production method.

Production Method for a Carbonaceous Material for a Non-Aqueous Electrolyte Secondary Battery Anode The carbonaceous material for a non-aqueous electrolyte secondary battery anode of the present invention is not limited but may be obtained by a method comprising: (1) impregnating an alkali metal to a carbonaceous material precursor by adding a compound including an elemental alkali metal to obtain an alkali-metal-impregnated carbonaceous material precursor; (2) a heat treatment step of (a) obtaining a heat-treated product by performing main heat treatment on the alkali-impregnated carbonaceous material precursor at 800° C. to 1500° C. in a non-oxidizing gas atmosphere, or (b) obtaining a heat-treated product by performing pre-heat treatment on the alkali-impregnated carbonaceous material precursor at a temperature of not less than 400° C. and less than 800° C. in a non-oxidizing gas atmosphere and then performing main heat treatment at 800° C. to 1500° C. in a non-oxidizing gas atmosphere; and (3) coating the heat-treated product with pyrolytic carbon.

Alkali Impregnating Step (1)

In the alkali impregnating step (1), a compound containing an elemental alkali metal is added to a carbonaceous material precursor.

Carbonaceous Material Precursor

The carbonaceous material precursor serving as a carbon source of the carbonaceous material of the present invention is not particularly limited as long as the material is a carbon material which assumes a composition having a carbon element content of not less than 80 wt. % if heat-treated at not less than 1100° C. in a non-oxidizing atmosphere.

If the carbonization yield of the carbonaceous material precursor at 1100° C. is too low, the proportion of the elemental alkali metal or the alkali metal compound with respect to the carbonaceous material precursor becomes excessive in the heat treatment step (2) described below. Such an excessive ratio is not preferable as it leads to a reaction such as an increase in specific surface area. Therefore, the carbonization yield if the carbonaceous material precursor is heat-treated at 1100° C. in a non-oxidizing atmosphere is preferably not less than 30 wt. %, more preferably not less than 40 wt. %, and even more preferably not less than 50 wt. %.

In this specification, the carbonaceous material precursor is not particularly limited, but the atomic ratio (H/C) of hydrogen atoms to carbon atoms is preferably not less than 0.05, more preferably not less than 0.15, and particularly preferably not less than 0.30. A carbon precursor having an H/C of less than 0.05 is thought to be heat-treated prior to alkali impregnating. Even if such a carbon precursor is subjected to alkali impregnating, the elemental alkali metal or the like cannot be sufficiently impregnated in the carbon precursor. Therefore, even when heat treatment is performed after alkali impregnating, it may be difficult to form sufficient pores that would enable the doping and de-doping of a large amount of lithium.

The carbon source of the carbonaceous material precursor is not particularly limited, and examples include petroleum pitch or tar, or coal pitch or tar, or thermoplastic resin (for example, ketone resin, polyvinyl alcohol, polyethylene terephthalate, polyacetal, polyacrylonitrile, styrene/divinylbenzene copolymer, polyimide, polycarbonate, modified polyphenylene ether, polybutylene terephthalate, polyarylate, polysulfone, polyphenylene sulfide, polyimide resin, fluororesin, polyamideimide, aramid resin, or polyetheretherketone), and thermosetting resins (for example, epoxy resin, urethane resin, urea resin, diallylphthalate resin, polyester resin, polycarbonate resin, silicon resin, polyacetal resin, nylon resin, furan resin, phenol resin, melamine resin, amino resin, and amide resin).

The carbonaceous material precursor of the present invention is preferably an easily graphitizable carbonaceous material or a non-graphitizable carbonaceous material. Therefore, when a petroleum pitch or tar, a coal pitch or tar, or a thermoplastic resin is used as a carbon source, crosslinking (infusibilization) treatment such as oxidation may be performed, but a relatively low oxygen content (degree of oxygen crosslinking) is preferable. In addition, the carbonaceous material of the present invention may also be obtained without infusibilization. That is, the purpose of performing crosslinking treatment on the tar or pitch is to continuously control the structure of the tar or pitch subjected to crosslinking treatment from an easily graphitizable carbon precursor to a non-graphitizable carbon precursor. Examples of tar or pitch include petroleum or coal tar or pitch produced as a by-product at the time of ethylene production, coal tar produced at the time of coal carbonization, heavy components or pitch from which the low-boiling-point components of coal tar are distilled out, or tar and pitch obtained by coal liquefaction. Two or more of these types of tar and pitch may also be mixed together and used.

Infusibilization Treatment

Examples of methods of crosslinking treatment of a petroleum pitch or tar, a carbon pitch or tar, a thermoplastic resin, or the like include a method of using a crosslinking agent or a method of treating the composition with an oxidizer such as air.

When promoting crosslinking reactions by treating the material with an oxidizer such as air, it is preferable to obtain the carbon precursor with the following method. Specifically, after a 2- or 3-ring aromatic compound with a boiling point of at least 200° C. or a mixture thereof is added to a petroleum or coal pitch or the like as an additive and mixed while stirring, the mixture is molded to obtain a pitch compact. Next, after the additive is extracted and removed from the pitch compact with a solvent having low solubility with respect to the pitch and having high solubility with respect to the additive so as to form a porous pitch, the mixture is oxidized using an oxidizer to obtain a carbon precursor. The purpose of the aromatic additive described above is to make the compact porous by extracting and removing the additive from the pitch compact after molding so as to facilitate crosslinking treatment by means of oxidation and to make the carbonaceous material obtained after carbonization porous. Such an additive described may be selected, for example, from one type of naphthalene, methyl naphthalene, phenyl naphthalene, benzyl naphthalene, methyl anthracene, phenanthrene, or biphenyl or a mixture of two or more types thereof. The added amount relative to the pitch is preferably in the range from 30 to 70 parts by weight relative to 100 parts by weight of pitch. To achieve a homogeneous mixture of the pitch and the additive, they are mixed in the molten state while heating. The mixture of the pitch and the additive is preferably molded into particles with a particle size of at most 1 mm so that the additive can be easily extracted from the mixture. Molding may be performed in the melted state or may be performed by cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the compact of the mixture of pitch and additive using such a solvent, the additive can be removed from the compact while the spherical shape of the compact is maintained. It is surmised that holes are formed by the additive in the compact at this time, and a pitch compact having uniform porosity can be obtained.

Furthermore, as a method for preparing a porous pitch compact other than the above method, the following method may be used. Petroleum or coal pitch or the like is pulverized to an average particle size (median diameter) of not greater than 60 μm, and then the fine powdered pitch, preferably fine powdered pitch having an average particle size (median diameter) of not less than 5 μm and not greater than 40 μm, is compression molded to form a porous compression molded compact. For compression molding, an existing molding machine may be used, specific examples of which include a single-action vertical molder, a continuous rotary molder, and a roll compression molder, but it is not limited thereto. The pressure during compression molding is preferably surface pressure of 20 to 100 MPa or linear pressure of 0.1 to 6 MN/m, and more preferably surface pressure of 23 to 86 MPa or linear pressure of 0.2 to 3 MN/m. The holding time of pressure during compression molding may be determined as appropriate according to the type of molding machine and the properties and treated quantity of the fine powdered pitch, but is generally in the range of from 0.1 sec to 1 min. A binder may be compounded as necessary while compression molding the fine powdered pitch. Specific examples of the binder include water, starch, methylcellulose, polyethylene, polyvinyl alcohol, polyurethane, phenol resin, and the like, but the binder is not necessarily limited thereto. The shape of the porous pitch compact obtained by compression molding may be particles, round cylinders, spheres, pellets, plates, honeycombs, blocks, Raschig rings, and the like, without particular limitation.

In order to crosslink the obtained porous pitch, the substance is then preferably oxidized using an oxidizer at a temperature of from 120 to 400° C. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, when the softening point of the pitch or the like is low, the pitch melts at the time of oxidation, which makes oxidation difficult, so the pitch or the like that is used preferably has a softening point of at least 150° C.

Infusibilization treatment may be performed when a petroleum pitch or tar, coal pitch or tar, or thermoplastic resin other than a porous pitch obtained with the method described above is used as a carbon precursor. That is, the method used for infusibilization treatment is not particularly limited, but infusibilization treatment may be performed using an oxidizer, for example. The oxidizer is also not particularly limited, but an oxidizing gas such as $O_2$, $O_3$, $SO_3$, $NO_2$, a mixed gas in which these are diluted with air, nitrogen, or the like, or air may be used as a gas. In addition, an oxidizing liquid such as sulfuric acid, nitric acid, or hydrogen peroxide or a mixture thereof can be used as a liquid. The oxidation temperature is also not particularly limited but is preferably from 120 to 400° C. When the temperature is lower than 120° C., a crosslinked structure cannot be formed sufficiently, and particles fuse to one another in the heat treatment step. When the temperature exceeds 400° C., decomposition reactions become more prominent than crosslinking reactions, and the yield of the resulting carbon material becomes low.

The carbonaceous material precursor is not necessarily pulverized, but it may be pulverized in order to reduce the particle size. Pulverization may be performed before infusibilization, after infusibilization (before alkali impregnating), and/or after alkali impregnating. That is, the particle size may be adjusted to a particle size appropriate for infusibilization, a particle size appropriate for alkali impregnating, or a particle size appropriate for heat treatment. The pulverizer used for pulverization is not particularly limited, and a jet mill, a rod mill, a vibratory ball mill, or a hammer mill, for example, can be used.

As described above, the order of pulverization is not limited. However, in order to achieve a large charge/discharge capacity, which is the effect of the present invention, it is preferable to uniformly impregnate the carbonaceous material precursor with an alkali metal compound and then perform heat treatment. Therefore, it is preferable to perform pulverization before alkali impregnating—specifically, it is preferable to perform the pulverization step, the alkali impregnating step (1), the heat treatment step (2), and then the coating step (3) in this order. In order to achieve the particle size of the carbonaceous material that is ultimately obtained, it is preferable to pulverize the material to an average particle size of from 1 to 50 μm in the pulverization step.

The average particle size of the carbonaceous material precursor is not limited, but if the average particle size is too large, the impregnating of the alkali metal compound may be non-uniform, and a large charge/discharge capacity may not be achieved. Therefore, the upper limit of the average particle size is preferably not greater than 600 μm, more preferably not greater than 100 μm, and even more preferably not greater than 50 μm. On the other hand, when the average particle size is too small, the specific surface area may increase, and the irreversible capacity may increase as a result. In addition, the scattering or the like of particles may increase. Therefore, the lower limit of the average particle size is preferably not less than 1 μm, more preferably not less than 3 μm, and even more preferably not less than 5 μm.

Oxygen Content (Degree of Oxygen Crosslinking)

The oxygen content when the carbonaceous material precursor is infusibilized by oxidation is not particularly limited as long as the effect of the present invention can be achieved. Note that in this specification, the oxygen contained in the carbonaceous material precursor may be oxygen contained as a result of oxidation (infusibilization) or may be oxygen contained originally. However, in this specification, when the carbon precursor is infusibilized by oxidation, the oxygen atoms incorporated into the carbon precursor as a result of the oxidation reaction often play a role of crosslinking the molecules of the carbon precursor with one another, so the "degree of oxygen crosslinking" may be used with the same meaning as the "oxygen content".

Here, when infusibilization treatment by oxygen crosslinking is not performed, the oxygen content (degree of oxygen crosslinking) may be 0 wt. %, but the lower limit of the oxygen content (degree of oxygen crosslinking) is preferably not less than 1 wt. %, more preferably not less than 2 wt. %, and even more preferably not less than 3 wt. %. When the content is less than 1 wt. %, the selective orientation of hexagonal network planes in the carbon precursor may become high, and the repetition characteristics may become poor. The upper limit of the oxygen content (degree of oxygen crosslinking) is preferably not greater than 20 wt. %, more preferably not greater than 15 wt. %, and even more preferably not greater than 12 wt. %. When the content exceeds 20 wt. %, pores for storing lithium may not be sufficiently achieved. As described in Examples 10 and 11, even when oxidation is not performed, a carbonaceous material exhibiting a large charge/discharge capacity can be obtained.

True Density of Carbon Precursor

Because the true density of a carbon material varies due to the manner in which the hexagonal network planes are arranged, the so-called fine composition, or crystal perfection, the true density of a carbonaceous material is an effective indicator of the structure of carbon. Although a carbonaceous material is obtained as a result of the heat treatment of a carbonaceous material precursor, the true density of a carbonaceous material varies together with the heat treatment density, so the true density of a carbonaceous material obtained by treating a carbonaceous material precursor at a specific treatment temperature is an effective indicator of the structure of the carbonaceous material precursor.

The true density of the carbonaceous material precursor is not particularly limited. However, the lower limit of the true density of the carbonaceous material when the carbonaceous material precursor preferably used in the present invention is treated for one hour at 1100° C. in a nitrogen gas atmosphere is preferably not less than 1.45 g/cm$^3$, more preferably not less than 1.50 g/cm$^3$, and even more preferably not less than 1.55 g/cm$^3$. The upper limit of the true density is preferably not greater than 2.20 g/cm$^3$, more preferably not greater than 2.10 g/cm$^3$, and even more preferably not greater than 2.05 g/cm$^3$. If the true density of a carbonaceous material obtained by treating a carbonaceous material precursor for one hour at 1100° C. in a nitrogen gas atmosphere is from 1.45 to 2.20 g/cm$^3$, the true density of the resulting carbonaceous material can be controlled to 1.20 to 1.60 g/cm$^3$.

Elemental Alkali Metal or Compound Containing Elemental Alkali Metal

An elemental alkali metal such as lithium, sodium, or potassium may be used as the elemental alkali metal contained in the alkali metal compound with which the carbonaceous material precursor is impregnated. Lithium compounds present problems such as a lower space-expanding effect than other alkali metal compounds and smaller reserves than other elemental alkali metals. On the other hand, although metallic potassium is produced when heat treatment is performed on potassium compounds in a reducing atmosphere in the presence of carbon, metallic potassium has higher reactivity with moisture than other elemental alkali metals, which results in a problem in that the risk is particularly high. From such perspectives, sodium is preferable as an elemental alkali metal. By using sodium, it is possible to obtain a carbonaceous material which exhibits a particularly high charge/discharge capacity. The elemental alkali metal may be impregnated to the carbonaceous material precursor in the metal state, but it may also be impregnated as a compound containing an elemental alkali metal such as a hydroxide, a carbonate, a hydrogencarbonate, or a halogen compound (also called an alkali metal compound or an alkali compound hereafter). The alkali metal compound is not particularly limited, but a hydroxide or carbonate is preferable in that the permeability is high and that the carbonaceous material precursor can be impregnated uniformly, and a hydroxide is particularly preferable.

Alkali-Impregnated Carbonaceous Material Precursor

By adding an elemental alkali metal or an alkali metal compound to the carbonaceous material precursor described above, an alkali-impregnated carbonaceous material precursor can be obtained. The method for adding an elemental alkali metal or an alkali metal compound is not particularly limited. For example, a prescribed amount of an elemental alkali metal or an alkali metal compound may be mixed in a powder state. In addition, an alkali metal compound may be dissolved in an appropriate solvent to prepare an alkali metal compound solution. After this alkali metal compound solution is mixed with the carbonaceous material precursor, the solvent may be evaporated off to prepare a carbonaceous material precursor impregnated with an alkali metal compound. Specifically, although not particularly limited, an alkali metal hydroxide such as sodium hydroxide may be dissolved in water, which is a good solvent, to form an aqueous solution, and this may be added to the carbonaceous material precursor. After heating to 50° C. or higher, the water content may be removed at atmospheric pressure or reduced pressure so as to add the alkali metal compound to the carbonaceous material precursor. Carbon precursors are often hydrophobic, and if the affinity of the alkali metal compound aqueous solution is low, the affinity of the alkali metal compound aqueous solution to the carbonaceous material precursor can be improved by adding an alcohol as necessary. If an alkali hydroxide is used, the alkali metal hydroxide absorbs carbon dioxide upon impregnating treatment in the air so that the hydroxide transforms into a carbonate, which may reduce permeation of the alkali metal compound into the carbonaceous material precursor. Therefore, carbon dioxide concentration in the atmosphere is preferably reduced. Moisture should be removed to a degree that enables the fluidity of the alkali-impregnated carbon precursor to be maintained.

The impregnated amount of the alkali metal compound impregnated to the carbonaceous material precursor is not particularly limited, but the upper limit of the impregnated amount is preferably not greater than 70.0 wt. %, more preferably not greater than 60.0 wt. %, and even more preferably not greater than 50.0 wt. %. If the impregnated amount of the elemental alkali metal or the alkali metal compound is too large, excessive alkali activation occurs. Therefore, the specific surface area increases, and this causes the irreversible capacity to increase, which is not preferable. In addition, the lower limit of the added amount is not particularly limited but is preferably not less than 5.0 wt. %, more preferably not less than 10.0 wt. %, and even more preferably not less than 15.0 wt. %. When the added amount of the alkali metal compound is too small, it becomes difficult to form a porous structure for doping and de-doping, which is not preferable.

If an alkali metal compound is dissolved or dispersed in an aqueous solution or an appropriate solvent and impregnated to the carbonaceous material precursor, and the solvent such as water is then volatilized and dried, the alkali-impregnated carbonaceous material precursor may agglomerate and become a solid. If an alkali-impregnated carbonaceous material precursor in a solid state is subjected to pre-heat treatment or main heat treatment, it is not possible to sufficiently discharge a cracked gas or the like generated at the time of heat treatment, which has an adverse effect on performance. Therefore, if the alkali-impregnated carbonaceous material precursor is a solid material, it is preferable to perform pre-heat treatment and/or main heat treatment after cracking the alkali-impregnated carbonaceous material precursor.

Heat Treatment Step (2)

The heat treatment step comprises (a) performing main heat treatment on the alkali-impregnated carbonaceous material precursor at 800° C. to 1500° C. in a non-oxidizing gas atmosphere or (b) performing pre-heat treatment on the alkali-impregnated carbonaceous material precursor at a temperature of not less than 400° C. and less than 800° C. in a non-oxidizing gas atmosphere and then performing main heat treatment at 800° C. to 1500° C. in a non-oxidizing gas atmosphere. In the heat treatment step for obtaining the carbonaceous material for a non-aqueous electrolyte secondary battery anode according to the present invention, pre-heat treatment may be performed first and main heat treatment may then be performed in accordance with the operation of (b) described above, or main heat treatment may be performed without performing pre-heat treatment in accordance with the operation of (a) described above.

Pre-Heat Treatment

Pre-heat treatment can remove volatile content such as $CO_2$, CO, $CH_4$, and $H_2$ as well as tar content. In addition, when the alkali-impregnated carbonaceous material precursor is heat-treated directly at a high temperature, large amounts of a decomposition products are generated from the alkali-impregnated carbonaceous material precursor. These decomposition products cause secondary decomposition reactions at high temperatures and may adhere to the surface of the carbon material, which may cause a decrease in battery performance, and the decomposition products may adhere to the inside of the heat treatment furnace, which may cause the blockage of the furnace. Therefore, it is preferable to perform pre-heat treatment prior to performing main heat treatment so as to reduce decomposition products at the time of main heat treatment. If the pre-heat treatment temperature is too low, the removal of decomposition products may be insufficient. On the other hand, if the pre-heat treatment temperature is too high, the decomposition products may cause reactions such as secondary decomposition reactions. The pre-heat treatment temperature is preferably not less than 400° C. and less than 800° C. and is more preferably not less than 500° C. and less than 800° C. If the pre-heat treatment temperature is lower than 400° C., de-tarring becomes insufficient, and the amount of tar or gas generated in the main heat treatment step after pulverization becomes large. This may adhere to the particle surface and cause failure to maintain the surface property after pulverization, leading to a decrease in battery performance. On the other hand, if the pre-heat treatment temperature is 800° C. or higher, the temperature exceeds the tar-generating temperature range, and the used energy efficiency decreases. Furthermore, the generated tar causes a secondary decomposition reaction, and the tar adheres to the carbon precursor and causes a decrease in performance.

Pre-heat treatment is performed in a non-oxidizing gas atmosphere, and examples of non-oxidizing gases include helium, nitrogen, and argon. In addition, pre-heat treatment can be performed under reduced pressure at a pressure of 10 kPa or lower, for example. The pre-heat treatment time is not particularly limited, but pre-heat treatment may be performed for 0.5 to 10 hours, for example, and is preferably performed for 1 to 5 hours.

Pulverization

Because the elemental alkali metal or the alkali metal compound can be impregnated uniformly and can impregnate easily into the carbonaceous material precursor, it is preferable to impregnate the elemental alkali metal or the alkali metal compound to the carbonaceous material precursor with a smaller particle size. Therefore, the carbonaceous material precursor is preferably pulverized prior to pre-heat treatment, but the carbonaceous material precursor may be melted during pre-heat treatment, so the particle size may be adjusted by pulverizing the carbonaceous material precursor after performing pre-heat treatment on the carbonaceous material precursor in advance. In addition, as described above, when the elemental alkali metal or the alkali metal compound is dissolved or dispersed in an aqueous solution or an appropriate solvent and impregnated to the carbonaceous material precursor, and the solvent such as water is then volatilized and dried, the alkali-impregnated and dissolved carbonaceous material precursor may agglomerate and become a solid. Therefore, if the alkali-impregnated carbonaceous material precursor is a solid material, it is preferable to pulverize the alkali-impregnated carbonaceous material precursor. Pulverization may also be performed after carbonization (after main heat treatment), but when the carbonization reaction progresses, the carbon precursor becomes hard, which makes it difficult to control the particle size distribution by means of pulverization. Therefore, the pulverization step is preferably performed after pre-heat treatment at a temperature of at most 800° C. and before the main heat treatment. The average particle size of the carbonaceous material of the present invention can be set to 1 to 50 μm by pulverization. The pulverizer used for pulverization is not particularly limited, and a jet mill, a rod mill, a vibratory ball mill, or a hammer mill, for example, can be used, but a jet mill equipped with a classifier is preferable.

Washing Alkali Metals and Alkali Metal Compounds

In the heat treatment step (2) of the present invention, alkali metals and alkali metal compounds are preferably removed (washing of the alkali compound). When alkali metals and alkali metal compounds remain in large amounts, the carbonaceous material becomes strongly alkaline. For example, when producing an anode using a PVDF (polyvinylidene fluoride) as a binder, the PVDF may be gelified if the carbonaceous material is strongly alkaline. In addition, when alkali metals remain in the carbonaceous material, the alkali metals may transition to the opposite pole at the time of the discharge of the secondary battery, which may have an adverse effect on the charge/discharge characteristics. Therefore, it is preferable to remove the alkali metal compounds from the carbonaceous material precursor.

That is, the washing (decalcification) of alkali metals and alkali metal compounds is performed in order to prevent the alkali metal compounds from remaining in the carbonaceous material. When the impregnated amount of the elemental alkali metal or the like is small, the residual amount of the alkali metal becomes small, but the lithium doping/de-doping capacity tends to be diminished. In addition, when the heat treatment temperature is high, the alkali metal is volatilized and the residual amount becomes small, however, if the heat treatment temperature is too high, the pores for storing lithium become small, and the lithium doping/de-doping capacity is diminished, which is not preferable. Therefore, if the impregnated amount of the elemental alkali metal or the like is small and if the heat treatment temperature is low, it is preferable to wash the alkali compound to reduce the residual amount of the alkali metal.

The washing of the alkali compound is not particularly limited but may be performed before or after main heat treatment. Therefore, the heat treatment step (2)(a) may be (2) a heat treatment step of (a1) performing main heat treatment on the alkali-impregnated carbonaceous material precursor at 800° C. to 1500° C. in a non-oxidizing gas atmosphere and then removing alkali metals and compounds containing elemental alkali metals by washing. In addition, the heat treatment step (2)(b) may be (2) a heat treatment step of (b1) performing pre-heat treatment on the alkali-impregnated carbonaceous material precursor at a temperature of not lower than 400° C. and lower than 800° C. in a non-oxidizing gas atmosphere, removing alkali metals and compounds containing elemental alkali metals by washing, and then performing main heat treatment at a temperature of from 800° C. to 1500° C. in a non-oxidizing gas atmosphere to obtain a heat-treated product, or (b2) performing pre-heat treatment at a temperature of not lower than 400° C. and lower than 800° C. in a non-oxidizing gas atmosphere, performing main heat treatment at a temperature of from 800° C. to 1500° C. in a non-oxidizing gas atmosphere, and then removing alkali metals and compounds containing elemental alkali metals by washing to obtain a heat-treated product.

The washing of alkali metals and alkali compounds can be performed in accordance with an ordinary method. Specifically, alkali compounds can be washed with a gas phase or a liquid phase. In the case of a gas phase, elemental alkali metals or alkali metal compounds are removed by volatilization at a high temperature. In the case of a liquid phase, alkali metals and alkali compounds are removed as follows.

In order to wash alkali metals and alkali metal compounds from the carbonaceous material precursor by washing, it is preferable to first pulverize the alkali-impregnated carbonaceous material precursor to form fine particles and to then treat the fine particles by immersing them in water or an acid such as hydrochloric acid. That is, acid washing or water washing is preferable, and water washing entailing treatment by immersion in water is particularly preferable. The acid or water that is used may be used at room temperature, but a heated substance (for example, hot water) may also be used. When the particle size of the treated product at the time of alkali compound washing is large, the washing rate may be diminished. The average particle size of the treated product is preferably not greater than 100 μm and more preferably not greater than 50 μm. Alkali compound washing is not particularly limited, but performing alkali compound washing on the carbon precursor obtained by pre-heat treatment is advantageous for enhancing the washing rate. If the pre-heat treatment temperature is a high temperature exceeding 800° C., the washing ratio conversely decreases, which is not preferable.

Alkali compound washing may also be performed by immersing the treated product in water or an acid such as hydrochloric acid so as to extract or remove elemental alkali metals or alkali metal compounds. In immersion treatment for performing alkali compound washing, performing one immersion treatment for a long period of time is more effective for enhancing the washing rate than repeatedly performing immersion treatments for short periods of time. In alkali compound washing, immersion treatment with water may be performed approximately two or more times after immersion treatment with an acid is performed.

Main Heat Treatment

Main heat treatment in the production method of the present invention can be performed in accordance with an ordinary main heat treatment procedure, and a carbonaceous material for a non-aqueous electrolyte secondary battery anode can be obtained by performing main heat treatment. The temperature of main heat treatment is from 800 to 1500° C. The lower limit of the heat treatment temperature in the present invention is not lower than 800° C., more preferably not lower than 1100° C., and particularly preferably not lower than 1150° C. When the heat treatment temperature is too low, carbonization may be insufficient, and the irreversible capacity may increase. In addition, making the heat treatment temperature high enables the volatilization of alkali metals from the carbonaceous material. That is, a large amount of functional groups remain in the carbonaceous material, the value of H/C increases, and the irreversible capacity also increases due to a reaction with lithium. The upper limit of the main heat treatment temperature in the present invention is not higher than 1500° C., more preferably not higher than 1400° C., and particularly not higher than 1300° C. If the main heat treatment temperature exceeds 1500° C., the pores formed as lithium storage sites may be reduced, and the doping and de-doping capacity may be diminished. That is, the selective orientation of carbon hexagonal planes may become high, and the discharge capacity may be diminished.

Main heat treatment is preferably performed in a non-oxidizing gas atmosphere. Examples of non-oxidizing gases include helium, nitrogen, and argon, and the like, and these may be used alone or as a mixture. Furthermore, main heat treatment can be performed under reduced pressure at a pressure of not higher than 10 kPa, for example. The main heat treatment time is not particularly limited, but main heat treatment can be performed for 0.1 to 10 hours, for example, and is preferably performed for 0.3 to 8 hours, and more preferably for 0.4 to 6 hours.

Coating Step (3)

The production method of the present invention includes a step of coating the fired product with pyrolytic carbon. Coating with pyrolytic carbon may be performed using the CVD method described in Patent Document 7, for example. Specifically, a heat-treated product is brought into contact with a straight-chain or cyclic hydrocarbon gas, and carbon purified by thermolysis is vapor-deposited onto the heat-treated product. This method is well known as the so-called chemical vapor deposition method (CVD method). The specific surface area of the obtained carbonaceous material can be controlled by the covering step using pyrolytic carbon. The pyrolytic carbon used in the present invention is not limited as long as it can be added as a hydrocarbon gas and can reduce the specific surface area of the carbonaceous material. The hydrocarbon gas is preferably mixed with a non-oxidizing gas and brought into contact with the carbonaceous material.

The number of carbon atoms of the hydrocarbon is not limited but is preferably from 1 to 25, more preferably from 1 to 20, even more preferably from 1 to 15, and most preferably from 1 to 10.

The carbon source of the hydrocarbon gas is also not limited, but examples include methane, ethane, propane, butane, pentane, hexane, octane, nonane, decane, ethylene, propylene, butene, pentene, hexene, acetylene, cyclopentane, cyclohexane, cycloheptane, cyclooctane, cyclononane, cyclopropene, cyclopentene, cyclohexene, cycloheptene, cyclooctene, decalin, norbornene, methylcyclohexane, norbornadiene, benzene, toluene, xylene, mesitylene, cumene, butylbenzene, and styrene. In addition, a hydrocarbon gas produced by heating a gaseous organic substance and a solid or liquid organic substance may also be used as a carbon source for the hydrocarbon gas.

The contact temperature is not limited but is preferably from 600 to 1000° C., more preferably from 650 to 1000° C., and even more preferably from 700 to 950° C. The contact time is also not particularly limited but is preferably from 10 minutes to 5.0 hours and more preferably from 15 minutes to 3 hours. However, the preferable contact time differs depending on the coated carbonaceous material, and the specific surface area of the obtained carbonaceous material can basically be reduced as the contact time becomes longer. That is, the coating step is preferably performed under conditions in which the specific surface area of the obtained carbonaceous material is not greater than 30 $m^2/g$.

In addition, the device used for coating is not limited, but coating may be performed, for example, with a continuous or batch in-layer circulation method using a fluidized reactor. The amount of gas supplied (circulated amount) is also not limited.

Nitrogen or argon may be used as a non-oxidizing gas. The amount of the hydrocarbon gas added to the non-oxidizing gas is preferably from 0.1 to 50 vol. %, more preferably from 0.5 to 25 vol. %, and even more preferably from 1 to 15 vol. %.

Reheating Treatment Step (4)

The production method of the present invention preferably includes a reheating treatment step (4). This reheating treatment step is a step for carbonizing the pyrolytic carbon coated on the surface in the heat treatment step (3).

The temperature in the reheating treatment step is, for example, from 800 to 1500° C. The lower limit of temperature of the reheating treatment step is not lower than 800° C., more preferably not lower than 1000° C., and particularly preferably not lower than 1050° C. The upper limit of temperature of the reheating treatment step in the present invention is not higher than 1500° C., more preferably not higher than 1400° C., and particularly preferably not higher than 1300° C.

The reheating treatment step is performed in a non-oxidizing gas atmosphere. Examples of non-oxidizing gases include helium, nitrogen, and argon, and the like, and these may be used alone or as a mixture. In addition, reheating treatment can be performed under reduced pressure at a pressure of 10 kPa or lower, for example. The reheating treatment time is not particularly limited, but reheating treatment can be performed for 0.1 to 10 hours, for example, and is preferably performed for 0.3 to 8 hours, and more preferably for 0.4 to 6 hours.

[2] Non-Aqueous Electrolyte Secondary Battery Anode

Production of Anode

An anode that uses the carbonaceous material of the present invention can be produced by adding a binder to the carbonaceous material, adding appropriate amount of suitable solvent, kneading to form an electrode mixture, subsequently, coating the electrode mixture on a collector formed from a metal plate or the like and drying, and then pressure-forming. An electrode having high conductivity can be produced by using the carbonaceous material of the present invention without particularly adding a conductivity agent, but a conductivity agent may be added as necessary when preparing the electrode mixture for the purpose of imparting even higher conductivity. As the conductivity agent, acetylene black, Ketjen black, carbon nanofibers, carbon nanotubes, carbon fibers, or the like can be used. The added amount of the conductivity agent differs depending on the type of the conductivity agent that is used, but when the added amount is too small, the expected conductivity cannot be achieved, which is not preferable. Conversely, when the added amount is too large, dispersion of the conductivity agent in the electrode mixture becomes poor, which is not preferable. From this perspective, the proportion of the added amount of the conductivity agent is preferably from 0.5 to 15 wt. % (here, it is assumed that the amount of the active material (carbonaceous material)+the amount of the binder+the amount of the conductivity agent=100 wt. %), more preferably from 0.5 to 7 wt. %, and particularly preferably from 0.5 to 5 wt. %. The binder is not particularly limited as long as the binder does not react with an electrolyte solution such as polyvinylidene fluoride (PVDF), polytetrafluoroethylene, and a mixture of styrene-butadiene rubber (SBR) and carboxymethyl cellulose (CMC). Of these, PVDF is preferable since the PVDF attached on the surface of an active material does not inhibit migration of lithium-ions and excellent input/output characteristics is achieved. In order to form a slurry by dissolving PVDF, a polar solvent such as N-methylpyrrolidone (NMP) can be preferably used; however, aqueous emulsion, such as SBR, or CMC can be also used by dissolving in water. When the added amount of the binder is too large, since the resistance of the resulting electrode becomes large, the internal resistance of the battery becomes large. This diminishes the battery characteristics, which is not preferable. When the added amount of the binder is too small, the bonds between the anode material particles, and the bonds between the anode material particles and the current collector become insufficient, which is not preferable. Preferable amount of the binder that is added differs depending on the type of the binder that is used; however, the amount of binder is, when a PVDF-based binder is used, preferably from 3 to 13 wt. %, and more preferably from 3 to 10 wt. %. On the other hand, in the case of a binder using water as a solvent, a plurality of binders such as a mixture of SBR and CMC are often used in combination, and the total amount of all of the binders that are used is preferably from 0.5 to 5 wt. % and more preferably from 1 to 4 wt. %. The electrode active material layer is typically formed on both sides of the current collector, but the layer may be formed on one side as necessary. The number of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable. The thickness of a preferable active material layer (per side) is not limited and is within the range of from 10 µm to 1000 µm, but the thickness is preferably from 10 to 80 µm, more preferably from 20 to 75 µm, and particularly preferably from 20 to 60 µm. An anode ordinarily has a current collector. SUS, copper, nickel, or carbon, for example, can be used as an anode current collector, but of these, copper or SUS is preferable.

[3] Non-Aqueous Electrolyte Secondary Battery

If an anode for a non-aqueous electrolyte secondary battery is formed using the anode material of the present invention, the other materials constituting the battery such as the cathode material, separators, and the electrolyte solution are not particularly limited, and various materials that have been conventionally used or proposed for non-aqueous solvent secondary batteries can be used.

Cathode

The cathode contains a cathode active material and may further contain a conductivity agent and/or a binder. The mixing ratio of the cathode active material and other materials in the cathode active material layer is not limited and may be determined appropriately as long as the effect of the present invention can be achieved.

The cathode active material can be used without limiting the cathode active material. For example, layered oxide-based (as represented by $LiMO_2$, where M is a metal such as $LiCoO_2$, $LiNiO_2$, $LiMnO_2$, or $LiNi_xCo_yMn_zO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable, and these chalcogen compounds may be mixed as necessary.

In addition, ternary [Li(Ni—Mn—Co)$O_2$] materials in which the material stability is enhanced by replacing some of the cobalt of lithium cobaltate with nickel and manganese and using the three components of cobalt, nickel, and manganese, and NCA-based materials [Li(Ni—Co—Al)$O_2$] in which aluminum is used instead of manganese in the ternary materials described above are known, and these materials may be used.

The cathode may further contain a conductivity agent and/or a binder. Examples of conductivity agents include acetylene black, Ketjen black, and carbon fibers. The content of the binder is not limited but may be from 0.5 to 15 wt. %, for example. An example of a binder is a fluorine-containing binder such as PTFE or PVDF. The content of the binder is not limited but may be from 0.5 to 15 wt. %, for example. The thickness of the cathode active material layer is not limited but is within the range of from 10 µm to 1000 µm, for example.

The cathode active material layer ordinarily has a current collector. SUS, aluminum, nickel, iron, titanium, and carbon, for example, can be used as a cathode current collector, and of these, aluminum or SUS is preferable.

Electrolyte Solution

A non-aqueous electrolyte solution used with this cathode and anode combination is typically formed by dissolving an electrolyte in a non-aqueous solvent. One type or two or more types of organic solvents such as propylene carbonate, ethylene carbonate, dimethyl carbonate, diethyl carbonate, dimethoxyethane, diethoxyethane, γ-butyl lactone, tetrahydrofuran, 2-methyl tetrahydrofuran, sulfolane, or 1,3-dioxolane, for example, may be used in combination as a non-aqueous solvent. Furthermore, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ and the like can be used as an electrolyte. The secondary battery is typically formed by immersing, in an electrolyte solution, a cathode layer and an anode layer, which are produced as described above, that are arranged facing each other via, as necessary, a liquid permeable separator formed from nonwoven fabric and other porous materials. As a separator, a liquid permeable separator formed from nonwoven fabric and other porous materials that is typically used in secondary batteries can be used. Alternatively, in place of a separator or together with a separator, a solid electrolyte formed from polymer gel in which an electrolyte solution is impregnated can be also used.

EXAMPLES

The present invention will be described in detail hereafter using examples, but these examples do not limit the scope of the present invention.

The measurement methods for the physical property values of the carbonaceous material for a non-aqueous electrolyte secondary battery of the present invention (the R-value determined by powder X-ray diffraction, the "specific surface area", the "true density determined by a butanol method", the "true density determined by a helium method", the "average particle size determined by laser diffraction", and the "atomic ratio (H/C) of hydrogen/carbon") will be described hereinafter. The physical property values described in this specification, including those of the Examples, are based on values determined by the following methods.

R-Value Determined by Powder X-Ray Diffraction

A sample holder was filled with a carbonaceous material powder, and measurements were taken with a symmetrical reflection method using a Pert PRO manufactured by PANalytical B.V. under conditions with a scanning range of 8<2θ<50° and an applied current/applied voltage of 45 kV/40 mA, an X-ray diffraction pattern was obtained using CuKα rays (λ=1.5418 Å) monochromatized by an Ni filter. For the correction of the diffraction pattern, no correction was made for Lorentz polarization factor, absorption factor, atom scattering factor, background, or the like, and the diffraction angle was corrected using the diffraction line of the (111) surface of a high-purity silicon powder for a standard substance. The diffraction intensity used in Equation (1) is determined by measuring the diffraction intensity corresponding to the diffraction angle at an interval of not greater than 2θ=0.05°, and then calculating the average diffraction intensity in a range corresponding to 2θ of 0.2°. For example, when the measurement interval is 0.05°, the diffraction intensity is the average of four points (0.2/0.05=4 points). The $I_{max}$ and $I_{min}$ used in the calculation of the R-value was determined from the average diffraction intensity over the range of 0.2° for 2θ calculated in this way. For the diffraction strength at a diffraction of 2θ=35° as well, the value of $I_{35}$ was determined by measuring the diffraction intensity corresponding to the diffraction angle at a spacing of not greater than 2θ=0.05°, and then calculating the average diffraction intensity in a range corresponding to 2θ of 0.2° to 0.25° centered around 2θ=35°. For example, when the measurement spacing is 0.05°, this is the average value of the intensities at 2θ=34.90°, 34.95°, 35.00°, and 35.05°.

The R-value was then determined using Equation (1).

The diffraction intensity ratio (R-value) was determined by:

[Formula 4]

$$R = \frac{I_{max} - I_{35}}{I_{min} - I_{35}} \quad (1)$$

(In the formula, $I_{max}$ is the maximum value of the 002 diffraction intensity of carbon measured at an angle of diffraction (2θ) within the range of from 20 to 25° as determined by powder X-ray diffraction measured using CuKα rays; $I_{min}$ is the minimum value of the diffraction intensity measured at an angle of diffraction (2θ) within the range of from 15 to 20° as determined by powder X-ray diffraction; and $I_{35}$ is the diffraction intensity at an angle of diffraction (2θ) of 35° as determined by powder X-ray diffraction) is not greater than 1.25.

Specific Surface Area

The specific surface area was measured in accordance with the method prescribed in JIS Z8830. A summary is given below.

A value $v_m$ was determined by a one-point method (relative pressure x=0.2) based on nitrogen adsorption at the temperature of liquid nitrogen using the approximation formula derived from the BET equation:

$$v_m = 1/(v(1-x)), \quad \text{[Formula 5]}$$

and the specific area of the sample was calculated from the following formula:

specific area=$4.35 \times v_m (m^2/g)$ (Here, $v_m$ is the amount of adsorption ($cm^3/g$) required to form a monomolecular layer on the sample surface; v is the amount of adsorption ($cm^3/g$) actually measured, and x is the relative pressure).

Specifically, the amount of adsorption of nitrogen in the carbonaceous material at the temperature of liquid nitrogen was measured as follows using a "Flow Sorb II 2300" manufactured by Micromeritics.

A test tube was filled with the carbonaceous material, and the test tube was cooled to −196° C. while infusing helium gas containing nitrogen gas at a concentration of 20 mol % so that the nitrogen was adsorbed in the carbonaceous material. The test tube was returned to room temperature. The amount of nitrogen desorbed from the sample at this time was measured with a thermal conductivity detector and used as the adsorption gas amount v.

(True Density Determined by Butanol Method)

Measurements were performed using butanol in accordance with the method stipulated in JIS R7212. A summary is given below. Both the carbonaceous material precursor and the carbonaceous material were measured with the same measurement methods.

The mass ($m_1$) of a pycnometer with a bypass line having an internal volume of approximately 40 mL was precisely measured. Next, after a sample was placed flat at the bottom of the pycnometer so as to have a thickness of approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubbles were formed, the pycnometer was placed in a vacuum desiccator and gradually evacuated to a pressure of 2.0 to 2.7 kPa. The pressure was maintained for 20 minutes or longer, and after the generation of air bubbles stopped, the bottle was removed and further filled with 1-butanol. After a stopper was inserted, the bottle was immersed in a constant-temperature bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured. Next, the same pycnometer was filled with 1-butanol alone and immersed in a constant-temperature water bath in the same manner as described above. After the marked line was aligned, the mass ($m_3$) was measured. In addition, distilled water which was boiled immediately before use and from which the dissolved gas was removed was placed in the pycnometer and immersed in a constant-temperature water bath in the same manner as described above. After the marked line was aligned, the mass ($m_5$) was measured. The true density ($\rho_{Bt}$) is calculated using the following formula.

[Formula 6]

$$\rho_{Bt} = \frac{m_2 - m_1}{m_2 - m_1 - (m_4 - m_3)} \times \frac{m_3 - m_1}{m_5 - m_1} d$$

(Here, d is the specific gravity (0.9946) in water at 30° C.)

Average Particle Size

Three drops of a dispersant (cationic surfactant, "SN-WET 366" (manufactured by San Nopco Limited)) were added to approximately 0.1 g of a sample, and the dispersant was blended into the sample. Next, 30 mL of purified water was added, and after the sample was dispersed for approximately 2 minutes with an ultrasonic washer, the particle size distribution within the particle size range of from 0.05 to 3000 μm was determined with a particle size distribution measurement device ("SALD-3000J" manufactured by the Shimadzu Corporation).

The average particle size $D_{v50}$ (μm) was determined from the resulting particle size distribution as the particle size yielding a cumulative volume of 50%.

Helium True Density

The measurement of the true density $\rho_H$ using helium as a replacement medium was performed by vacuum-drying a sample for 12 hours at 200° C. using a multivolume pycnometer (Acupic 1330) manufactured by Micromeritics. The ambient temperature at the time of measurement was constant at 25° C. The pressure in this measurement method was the gauge pressure in each case and was a pressure determined by subtracting the ambient pressure from the absolute pressure.

The measurement device, a multivolume pycnometer manufactured by Micromeritics, is equipped with a sample chamber and an expansion chamber, and the sample chamber has a pressure gauge for measuring the pressure inside the chamber. The sample chamber and the expansion chamber are connected by a connection tube having a valve. A helium gas introduction tube having a stop valve is connected to the sample chamber, and a helium gas discharging tube having a stop valve is connected to the expansion chamber.

Measurements were performed as follows. The volume of the sample chamber ($V_{CELL}$) and the volume of the expansion chamber ($V_{EXP}$) were measured in advance using standard spheres. A sample was placed in the sample chamber, and after helium gas was introduced for 2 hours through the helium gas introduction tube of the sample chamber, the connection tube, and the helium gas discharging tube of the expansion chamber, the inside of the device was replaced with helium gas. Next, the valve between the sample chamber and the expansion chamber and the valve of the helium gas discharging tube from the expansion chamber were closed (so that helium gas of the same pressure as the ambient pressure remained in the expansion chamber), and after helium gas was introduced from the helium gas introduction tube of the sample chamber until the pressure reached 134 kPa, the stop valve of the helium gas introduction tube was closed. The pressure ($P_1$) of the sample chamber 5 minutes after the stop valve was closed was measured. Next, the valve between the sample chamber and the expansion chamber was opened so as to transfer helium gas to the expansion chamber, and the pressure ($P_2$) at that time was measured.

The volume of the sample ($V_{SAMP}$) was calculated with the following formula.

$$V_{SAMP} = V_{CELL} - V_{EXP}/[(P_1/P_2)-1]$$

Accordingly, when the weight of sample is defined as $W_{SAMP}$, the helium true density is:

$$\rho_H = W_{SAMP}/V_{SAMP}$$

Atomic Ratio (H/C) of Hydrogen/Carbon

The atomic ratio was measured in accordance with the method stipulated in JIS M8819. The ratio of the numbers of hydrogen/carbon atoms was determined from the mass ratio of hydrogen and carbon in a sample obtained by elemental analysis using a CHN analyzer.

Example 1

First, 70 kg of a petroleum pitch with a softening point of 205° C., the atomic ratio H/C of 0.65 and a quinoline insoluble content of 0.4 wt. % and 30 kg of naphthalene were charged into a pressure-resistant container with an internal volume of 300 liters and having a stirring blade and an outlet nozzle, and the substances were melted and mixed while heating. After the heat-melted and mixed petroleum pitch was then cooled, the petroleum pitch was pulverized, and the obtained pulverized product was charged into water at 90 to 100° C., dispersed while stirring, and cooled to obtain a spherical pitch compact. After most of the water was removed by filtration, the naphthalene in the spherical pitch compact was extracted with n-hexane and removed. A porous spherical pitch obtained as described above was subjected to heating and oxidation while being passed through heated air, and heat-infusible porous spherical oxidized pitch was thus obtained. The oxygen content (degree of oxygen crosslinking) of the porous spherical oxidized pitch was 6 wt. %. Next, 200 g of the infusible porous spherical oxidized pitch was pulverized for 20 minutes with a jet mill (AIR JET MILL manufactured by Hosokawa Micron Co., Ltd.; MODEL 100AFG) to form a pulverized carbonaceous material precursor with an average particle size of from 20 to 25 μm. After the obtained pulverized carbonaceous material precursor was impregnated with a sodium carbonate ($Na_2CO_3$) aqueous solution in a nitrogen atmosphere, the precursor was subjected to heated dehydration under reduced pressure to obtain a pulverized carbonaceous material precursor impregnated with 38.0 wt. % of $Na_2CO_3$ with respect to the pulverized carbonaceous material precursor. Next, 10 g of the pulverized carbonaceous material precursor impregnated with $Na_2CO_3$ (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1200° C. at a heating rate of 250° C./h, held at 1200° C. for 1 hour and subjected to main heat treatment to obtain heat-treated carbon. Main heat treatment was performed in a nitrogen atmosphere with a flow rate of 10 L/min. Next, 5 g of the obtained calcined carbon was placed in a quartz reaction tube and heated and held at 750° C. under a nitrogen gas air flow. The calcined carbon was then coated with pyrolytic carbon by replacing the nitrogen gas flowing into the reaction tube with a mixed gas of hexane and nitrogen gas. The infusion rate of hexane was 0.3 g/min, and after infusion for 30 minutes, the supply of hexane was stopped. After the gas inside the reaction tube was replaced with nitrogen, the sample was allowed to cool to obtain a carbonaceous material 1. Note that the average particle size of the obtained carbonaceous material was 19 μm.

Example 2

First, 70 kg of a petroleum pitch with a softening point of 205° C., the atomic ratio H/C of 0.65 and a quinoline insoluble content of 0.4 wt. % and 30 kg of naphthalene were charged into a pressure-resistant container with an internal volume of 300 liters and having a stirring blade and an outlet nozzle, and the substances were melted and mixed while heating. After the heat-melted and mixed petroleum pitch was then cooled, the petroleum pitch was pulverized, and the obtained pulverized product was charged into water at 90 to 100° C., dispersed while stirring, and cooled to obtain a spherical pitch compact. After most of the water was removed by filtration, the naphthalene in the spherical pitch compact was extracted with n-hexane and removed. A porous spherical pitch obtained as described above was subjected to heating and oxidation while being passed through heated air, and heat-infusible porous spherical oxidized pitch was thus obtained. The oxygen crosslinking degree of the porous spherical oxidized pitch was 18 wt. %. Next, 200 g of the infusible porous spherical oxidized pitch was pulverized for 20 minutes with a jet mill (AIR JET MILL manufactured by Hosokawa Micron Co., Ltd.; MODEL 100AFG) to form a pulverized carbonaceous material precursor with an average particle size of from 20 to 25 μm. After the obtained pulverized carbonaceous material precursor was impregnated with a KOH aqueous solution in a nitrogen atmosphere, the precursor was subjected to heated dehydration under reduced pressure to obtain a pulverized carbonaceous material precursor impregnated with 30.0 wt. % of KOH with respect to the pulverized carbonaceous material precursor. Next, 10 g of the pulverized carbonaceous material precursor impregnated with KOH (in terms of the mass of the pulverized carbon precursor) was placed in a horizontal tubular furnace and subjected to pre-heat treatment by holding the precursor for two hours at 600° C. in a nitrogen atmosphere, and the sample was then cooled. After pre-heat treatment, the carbonaceous material precursor was placed in a beaker and sufficiently washed with ion-exchanged water to remove the alkali metal compound, and after filtration, the carbonaceous material precursor was dried at 105° C. in a nitrogen atmosphere. The water-washed carbonaceous material precursor was heated to 1100° C. at a heating rate of 250° C./h in a nitrogen atmosphere, held for one hour at 1100° C., and subjected to main heat treatment to obtain heat-treated carbon. Main heat treatment was performed in a nitrogen atmosphere with a flow rate of 10 L/min. Next, 5 g of the obtained calcined carbon was placed in a quartz reaction tube and heated and held at 750° C. under a nitrogen gas air flow. The calcined carbon was then coated with pyrolytic carbon by replacing the nitrogen gas flowing into the reaction tube with a mixed gas of hexane and nitrogen gas. The infusion rate of cyclohexane was 0.3 g/min, and after infusion for 30 minutes, the supply of cyclohexane was stopped. After the gas inside the reaction tube was replaced with nitrogen, the sample was allowed to cool to obtain a carbonaceous material 2. Note that the average particle size of the obtained carbonaceous material was 21 μm.

Example 3

A heat-treated carbon coated with pyrolytic carbon was obtained by repeating the operations of Example 1 with the exception that the oxygen content (degree of oxygen crosslinking) was set to 13 wt. % instead of 6 wt. %, that 7 wt. % of NaOH was added instead of 38 wt. % of $Na_2CO_3$, that alkali compound washing was not performed, and that the heat-treated carbon was coated with pyrolytic carbon at a temperature of 700° C. instead of 750° C. Next, 5 g of this heat-treated carbon was placed in a horizontal tubular furnace and subjected to reheating treatment for one hour at 1100° C. in a non-oxidizing gas atmosphere to prepare a carbonaceous material 3. Note that the average particle size of the obtained carbonaceous material was 20 μm.

Example 4

A carbonaceous material 4 was obtained by repeating the operations of Example 1 with the exception that the oxygen content (degree of oxygen crosslinking) was set to 2 wt. % instead of 6 wt. %, and that 16.7 wt. % of NaOH was added instead of 38.0 wt. % of $Na_2CO_3$. Note that the average particle size of the obtained carbonaceous material was 18 μm.

Example 5

5 g of a heat-treated carbon prepared by repeating the operations of Example 4 was placed in a horizontal tubular furnace and subjected to reheating treatment for one hour at 1100° C. in a non-oxidizing gas atmosphere to prepare a carbonaceous material 5. Note that the average particle size of the obtained carbonaceous material was 18 μm.

Example 6

A carbonaceous material 6 was prepared by repeating the operations of Example 4 with the exception that 23.0 wt. % of NaOH was added instead of 16.7 wt. % of NaOH. Note that the average particle size of the obtained carbonaceous material was 18 μm.

Example 7

A carbonaceous material 7 was prepared by repeating the operations of Example 4 with the exception that 30.0 wt. % of NaOH was added instead of 16.7 wt. % of NaOH. Note that the average particle size of the obtained carbonaceous material was 18 μm.

Example 8

A carbonaceous material 8 was obtained by repeating the operations of Example 7 with the exception that the oxygen content (degree of oxygen crosslinking) was set to 6 wt. % instead of 2 wt. %. Note that the average particle size of the obtained carbonaceous material was 19 μm.

Example 9

A carbonaceous material 9 was obtained by repeating the operations of Example 6 with the exception that the oxygen content (degree of oxygen crosslinking) was set to 8 wt. % instead of 2 wt. %. Note that the average particle size of the obtained carbonaceous material was 19 μm.

Example 10

A carbonaceous material 10 was prepared by repeating the operations of Example 4 with the exception that the porous spherical pitch was not oxidized by heating. The oxygen content (degree of oxygen crosslinking) of the porous spherical oxidized pitch was 0 wt. % when heat treatment was not performed. Note that the average particle size of the obtained carbonaceous material was 18 μm.

Example 11

A carbonaceous material 11 was prepared by repeating the operations of Example 10 with the exception that 30.0 wt. % of NaOH was added instead of 16.7 wt. % of NaOH. Note that the average particle size of the obtained carbonaceous material was 18 μm.

Example 12

A carbonaceous material 12 was prepared by repeating the operations of Example 8 with the exception that the CVD treatment temperature was set to 900° C. instead of 750° C. Note that the average particle size of the obtained carbonaceous material was 19 µm.

Example 13

A carbonaceous material 13 was prepared by repeating the operations of Example 8 with the exception that the CVD treatment temperature was set to 1000° C. instead of 750° C. Note that the average particle size of the obtained carbonaceous material was 19 µm.

Example 14

A carbonaceous material 14 was prepared by repeating the operations of Example 12 with the exception that 33.0 wt. % of NaOH was added instead of 30.0 wt. % of NaOH. Note that the average particle size of the obtained carbonaceous material was 19 µm.

Example 15

A carbonaceous material 15 was prepared by repeating the operations of Example 8 with the exception that cyclohexane was used instead of hexane. Note that the average particle size of the obtained carbonaceous material was 19 µm.

Example 16

A carbonaceous material 16 was prepared by repeating the operations of Example 8 with the exception that butane was used instead of hexane. Note that the average particle size of the obtained carbonaceous material was 19 µm.

Example 17

After a coal pitch was pulverized to an average particle size of from 20 to 25 µm, the sample was oxidized by heating while heated air was circulated, and a pulverized carbonaceous material precursor which was infusible with respect to heat was obtained. The oxygen content (degree of oxygen crosslinking) of the obtained pulverized carbonaceous material precursor was 8 wt. %. After the obtained pulverized carbonaceous material precursor was impregnated with a sodium hydroxide aqueous solution in a nitrogen atmosphere, the precursor was subjected to heated dehydration under reduced pressure to obtain a pulverized carbonaceous material precursor impregnated with 30.0 wt. % of sodium hydroxide with respect to the pulverized carbonaceous material precursor. Next, 10 g of the pulverized carbonaceous material precursor impregnated with sodium hydroxide (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1200° C. at a heating rate of 250° C./h, held at 1200° C. for 1 hour and subjected to main heat treatment. Main heat treatment was performed in a nitrogen atmosphere with a flow rate of 10 L/min. Next, 5 g of the obtained calcined carbon was placed in a quartz reaction tube and heated and held at 750° C. under a nitrogen gas air flow. The calcined carbon was then coated with pyrolytic carbon by replacing the nitrogen gas flowing into the reaction tube with a mixed gas of hexane and nitrogen gas. The infusion rate of cyclohexane was 0.3 g/min, and after infusion for 30 minutes, the supply of cyclohexane was stopped. After the gas inside the reaction tube was replaced with nitrogen, the sample was allowed to cool to obtain a carbonaceous material 17. Note that the average particle size of the obtained carbonaceous material was 19 µm.

Example 18

A heat-treated carbon coated with pyrolytic carbon was obtained by repeating the operations of Example 1 with the exception that the oxygen content (degree of oxygen crosslinking) was set to 14 wt. % instead of 6 wt. %, that 15 wt. % of NaOH was added instead of 38 wt. % of $Na_2CO_3$, and that the main heat treatment temperature was set to 1150° C. instead of 1200° C. Next, 5 g of this heat-treated carbon was placed in a horizontal tubular furnace and subjected to reheating treatment for one hour at 1100° C. in a non-oxidizing gas atmosphere to prepare a carbonaceous material 18. Note that the average particle size of the obtained carbonaceous material was 20 µm.

Comparative Example 1

A comparative carbonaceous material 1 was prepared by repeating the operations of Example 1 with the exception that the oxygen content (degree of oxygen crosslinking) was set to 16 wt. % instead of 6 wt. %, that alkali impregnating was not performed, and that CVD treatment was not performed. Note that the average particle size of the obtained carbonaceous material was 20 µm.

Comparative Example 2

A comparative carbonaceous material 2 was prepared by repeating the operations of Comparative Example 1 with the exception that the oxygen content (degree of oxygen crosslinking) was set to 6 wt. % instead of 16 wt. %. Note that the average particle size of the obtained carbonaceous material was 19 µm.

Comparative Example 3

A comparative carbonaceous material 3 was prepared by repeating the operations of Example 4 with the exception that the added amount of NaOH was set to 50.0 wt. % instead of 16.7 wt. % and that the heat-treated carbon was not coated with pyrolytic carbon. Note that the average particle size of the obtained carbonaceous material was 18 µm, and although an attempt was made to produce an electrode with the same method as in Example 1, the specific surface area was large, and it was difficult to produce an electrode.

Comparative Example 4

A comparative carbonaceous material 4 was prepared by repeating the operations of Comparative Example 1 with the exception that the oxygen content (degree of oxygen crosslinking) was set to 18 wt. % instead of 16 wt. % and that the main heat treatment temperature was set to 800° C. instead of 1200° C. Note that the average particle size of the obtained carbonaceous material was 20 µm.

Comparative Example 5

A carbonaceous material 5 was prepared by repeating the operations of Comparative Example 4 with the exception that the main heat treatment temperature was set to 1500° C.

instead of 800° C. Note that the average particle size of the obtained carbonaceous material was 20 μm.

Non-aqueous electrolyte secondary batteries were produced by means of the following operations (a) and (b) using the electrodes obtained in Examples 1 to 17 and Comparative Examples 1 to 5, and the electrode and battery performances thereof were evaluated.

(a) Production of Test Battery

Although the carbon material of the present invention is suitable for forming an anode for a non-aqueous electrolyte secondary battery, in order to precisely evaluate the discharge capacity (de-doping capacity) and the irreversible capacity (non-de-doping capacity) of the battery active material without being affected by fluctuation in the performances of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016-size coin-type battery can in advance, punching a thin sheet of metal lithium with a thickness of 0.8 mm into a disc shape with a diameter of 15 mm, and pressing the thin sheet of metal lithium into the stainless steel mesh disc.

Using a pair of electrodes produced in this way, $LiPF_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 19 mm to assemble a 2016 coin-type non-aqueous electrolyte lithium secondary battery in an Ar glove box.

(b) Measurement of Battery Capacity

Charge-discharge tests were performed on a lithium secondary battery with the configuration described above using a charge-discharge tester ("TOSCAT" manufactured by Toyo System Co., Ltd.). Here, in a battery comprising a lithium chalcogen compound for the cathode, the doping reaction for doping lithium into the carbon electrode is called "charging", and in a battery comprising lithium metal for a counter electrode, as in the test battery of the present invention, the doping reaction for the carbon electrode is called "discharging". The manner in which the doping reactions for doping lithium into the same carbon electrode thus differs depending on the pair of electrodes used. Therefore, the doping reaction for inserting lithium into the carbon electrode will be described as "charging" hereafter for the sake of convenience. Conversely, "discharging" refers to a charging reaction in the test battery but is described as "discharging" for the sake of convenience since it is a de-doping reaction for removing lithium from the carbon material. A doping reaction was performed by repeating an operation of turning on the power for 1 hour at a current density of 0.5 mA/cm$^2$ and then pausing for 2 hours until the equilibrium potential between terminals reached 5 mV. A value determined by dividing the amount of electricity at this time by the weight of carbonaceous material that was used was defined as the doping capacity, which was expressed in units of mAh/g. Next, a current was fed in the same manner but in the opposite direction to de-dope the carbonaceous material of the lithium with which it was doped. De-doping was performed by repeating an operation of turning on the power for 1 hour at a current density of 0.5 mA/cm$^2$ and then pausing for 2 hours, and terminal potential of 1.5 V was used as the cutoff voltage. At this time, a value determined by dividing the electrical discharge by the weight of the carbon material of the electrode is defined as the discharge capacity per unit weight of the carbon material (Ah/kg). Further, the product of the discharge capacity per unit weight and the true density was used as the discharge capacity per unit volume (Ah/L). In addition, the charge/discharge efficiency was determined by dividing the discharge capacity per unit weight by the charge capacity per unit weight. The charge/discharge efficiency was recorded as a percentage (%).

The charge/discharge capacities and the charge/discharge efficiency were calculated by averaging three measurements for test batteries produced using the same sample.

TABLE 1

| | Carbonaceous material | | | | | | | | |
|---|---|---|---|---|---|---|---|---|---|
| | Diffraction intensity | Particle size | | Helium true density | Butanol true density | SSA | Discharge capacity | | Charge/discharge |
| | R-value | μm | H/C | g/cm³ | g/cm³ | m²/g | Ah/kg | Ah/L | efficiency % |
| Example 1 | 1.18 | 19 | 0.03 | 2.19 | 1.45 | 5.9 | 581 | 842 | 87.5 |
| Example 2 | 1.12 | 21 | 0.04 | 2.21 | 1.41 | 1.7 | 586 | 826 | 84.3 |
| Example 3 | 1.24 | 20 | 0.03 | 2.14 | 1.49 | 2.3 | 554 | 825 | 90.1 |
| Example 4 | 1.15 | 18 | 0.03 | 2.22 | 1.43 | 2.1 | 583 | 834 | 86.0 |
| Example 5 | 1.15 | 18 | 0.03 | 2.22 | 1.43 | 3.9 | 580 | 829 | 89.4 |
| Example 6 | 1.07 | 18 | 0.03 | 2.18 | 1.38 | 2.9 | 648 | 894 | 86.1 |
| Example 7 | 1.01 | 18 | 0.03 | 2.21 | 1.34 | 3.7 | 655 | 878 | 83.4 |
| Example 8 | 1.00 | 19 | 0.03 | 2.20 | 1.33 | 3.6 | 663 | 882 | 85.3 |
| Example 9 | 1.06 | 19 | 0.03 | 2.22 | 1.37 | 2.8 | 636 | 871 | 87.4 |
| Example 10 | 1.10 | 18 | 0.03 | 2.15 | 1.40 | 2.2 | 612 | 857 | 86.8 |
| Example 11 | 1.05 | 18 | 0.03 | 2.22 | 1.36 | 2.3 | 646 | 879 | 85.7 |
| Example 12 | 1.00 | 19 | 0.03 | 2.23 | 1.33 | 3.5 | 669 | 890 | 86.4 |
| Example 13 | 1.07 | 19 | 0.03 | 2.20 | 1.38 | 9.2 | 625 | 863 | 84.5 |
| Example 14 | 1.13 | 19 | 0.03 | 2.23 | 1.42 | 5.8 | 597 | 848 | 81.6 |
| Example 15 | 1.00 | 19 | 0.03 | 2.23 | 1.33 | 2.7 | 628 | 835 | 86.2 |
| Example 16 | 1.00 | 19 | 0.03 | 2.22 | 1.33 | 3.1 | 635 | 845 | 85.2 |
| Example 17 | 1.01 | 19 | 0.03 | 2.21 | 1.34 | 3.3 | 631 | 846 | 84.1 |
| Example 18 | 1.11 | 20 | 0.04 | — | 1.40 | 1.8 | 579 | 810 | 87.9 |
| Comparative Example 1 | 1.28 | 20 | 0.03 | 2.09 | 1.52 | 3.1 | 473 | 719 | 88.4 |

TABLE 1-continued

| | Carbonaceous material | | | | | | | | |
|---|---|---|---|---|---|---|---|---|---|
| | Diffraction intensity | Particle size | | Helium true density | Butanol true density | SSA | Discharge capacity | | Charge/discharge |
| | R-value | μm | H/C | g/cm³ | g/cm³ | m²/g | Ah/kg | Ah/L | efficiency % |
| Comparative Example 2 | 1.45 | 19 | 0.03 | 1.85 | 1.63 | 2.0 | 414 | 675 | 88.4 |
| Comparative Example 3 | 0.64 | 18 | 0.03 | 2.22 | 1.09 | 1132 | — | — | — |
| Comparative Example 4 | 1.18 | 20 | 0.14 | 2.19 | 1.45 | 82 | 536 | 777 | 57.4 |
| Comparative Example 5 | 1.32 | 20 | 0.01 | 2.07 | 1.55 | 2.4 | 187 | 290 | 86.2 |

The secondary batteries produced using the carbonaceous materials of Examples 1 to 18 having an R-value of not greater than 1.25 exhibited high discharge capacities from 554 to 663 Ah/kg and from 810 to 890 Ah/L. In addition, the charge/discharge efficiency was excellent at not less than 81.6%. On the other hand, the secondary batteries produced using the carbonaceous materials of Comparative Examples 1, 2, and 5 having an R-value exceeding 1.25 had a low discharge capacity. This may be due to the fact that the carbonaceous materials of Comparative Examples 1, 2, and 5 were not subjected to alkali impregnating and CVD treatment. The carbonaceous material of Comparative Example 4 had a low heat treatment temperature, so the H/C was high and the specific surface area was high, which prevented a high discharge capacity from being achieved.

INDUSTRIAL APPLICABILITY

The non-aqueous electrolyte secondary battery of the present invention has a high discharge capacity and excellent charge/discharge efficiency. Therefore, the battery can be effectively used in hybrid electric vehicles (HEVs) and electric vehicles (EVs).

The present invention has been described above using specific modes of embodiment, but modifications and improvements apparent to persons having ordinary skill in the art are also included in the scope of the present invention.

The invention claimed is:

1. A carbonaceous material for a non-aqueous electrolyte secondary battery anode;
    a specific surface area of the material determined by a BET method being not greater than 10 m²/g;
    an atomic Ratio, H/C, of hydrogen atoms to carbon atoms of the material determined by elemental analysis being not greater than 0.1;
    an average particle size of the material being not greater than 50 μm; and
    a diffraction intensity ratio (R-value) determined by Equation (1) being not greater than 1.25:

[Formula 1]

$$R = \frac{I_{max} - I_{35}}{I_{min} - I_{35}}, \quad (1)$$

wherein $I_{max}$ is a maximum value of a 002 diffraction intensity of carbon measured at an angle of diffraction (2θ) within a range of from 20 to 25° as determined by powder X-ray diffraction measured using CuKα rays; $I_{min}$ is a minimum value of a diffraction intensity measured at an angle of diffraction (2θ) within a range of from 15 to 20° as determined by powder X-ray diffraction; and $I_{35}$ is a diffraction intensity at an angle of diffraction (2θ) of 35° as determined by powder X-ray diffraction.

2. The carbonaceous material for a non-aqueous electrolyte secondary battery anode according to claim 1 containing from 0.05 to 5 wt. % of an elemental alkali metal.

3. A non-aqueous electrolyte secondary battery anode containing the carbonaceous material described in claim 1.

4. A non-aqueous electrolyte secondary battery containing the carbonaceous material described in claim 1.

* * * * *